United States Patent [19]

Umney et al.

[11] Patent Number: 5,689,435
[45] Date of Patent: Nov. 18, 1997

[54] SYSTEMS AND METHODS FOR AUTOMATED BRACKET DESIGN

[75] Inventors: Michael A. Umney, Mason; John J. Wright, Monroe; James S. Hoelle, Hamilton; Michael S. Godbey, Cincinnati; Eric G. V. Hall, Milford; Kenneth J. Ashton, West Chester, all of Ohio

[73] Assignee: General Electric Company, Cincinnati, Ohio

[21] Appl. No.: 802,496

[22] Filed: Feb. 20, 1997

Related U.S. Application Data

[63] Continuation of Ser. No. 575,372, Dec. 20, 1995, abandoned.
[51] Int. Cl.$^6$ .................................................. G06F 19/00
[52] U.S. Cl. ................ 364/512; 364/474.01; 364/474.24
[58] Field of Search ........................... 395/964; 364/512, 364/474.01, 474.03, 474.04, 474.24

[56] References Cited

PUBLICATIONS

Deitz, Dan, "Hybrid CAD/CAM system," Mechanical Engineering, vol. 117, Issue 8, Aug. 1995, p. 40.

Primary Examiner—Kevin J. Teska
Assistant Examiner—A. S. Roberts
Attorney, Agent, or Firm—Andrew C. Hess; Patrick R. Scanlon

[57] ABSTRACT

A design system for designing brackets for gas turbine engines is described. The system may be implemented with a computer workstation and includes a part model library and a drawing note library. The computer workstation is configured to receive a bracket model in electronic form as input and has a number of executable modules stored therein. The system outputs a bracket master model and detail drawings. In one embodiment, the modules include a bracket intelligence builder module for generating intelligence data for the bracket model, a bracket unfolding module for unfolding a bracket model to a flat pattern, a bracket folding module to fold a bracket flat pattern, and a bracket minimum material check module to check for minimum distances between bracket pattern features. Other modules also are described and may form a elements of the system.

19 Claims, 32 Drawing Sheets

U SLOT BEND RELIEF

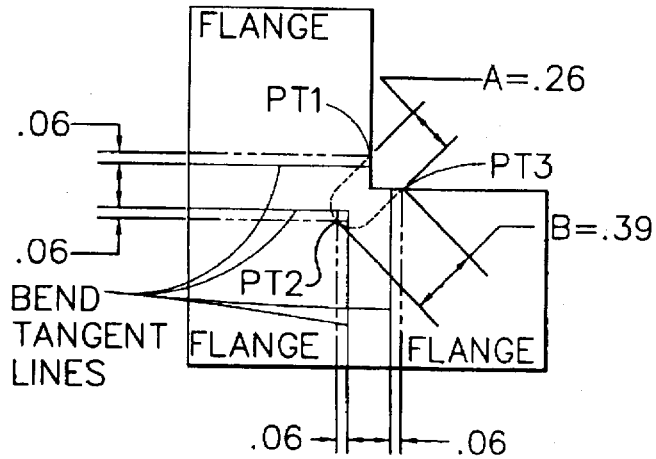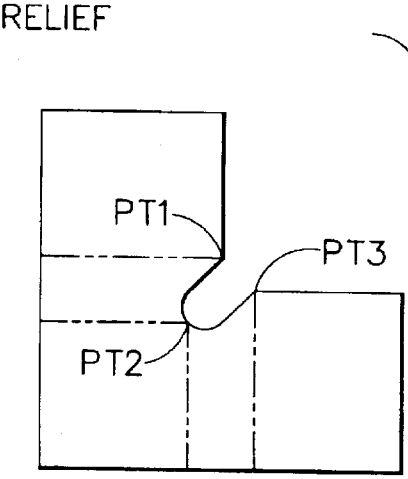

RULES:
1. CONSTRUCT LINES AT A CONSTANT OFFSET OF 0.06" FROM BEND TANGENT LINES.
2. INTERSECT THESE OFFSET LINES WITH FLANGE EDGES OR WITH ANOTHER OFFSET LINE IN CASE OF TWO BENDS ON THE SAME FLANGE TO GET PT1, PT2, AND PT3.
3. JOIN LINE PT1-PT3 ( LENGTH = "A" ).
4. DROP PERPENDICULAR FROM PT2 TO LINE PT1-PT3. ( LENGTH = "B" ).
5. "A" SHOULD BE LESS THAN "B" FOR U SLOT BEND RELIEF.
6. DRAW CIRCLE AT PT2 DIAMETER IS "A" AND THE CENTER IS ALONG THE PERPENDICULAR.
7. DRAW IMAGINARY LINE THROUGH PT2 AND PARALLEL TO THE LINE PT1-PT3.
8. CIRCLE IS TANGENT TO THIS IMAGINARY LINE.
9. DRAW TANGENTS TO CIRCLE FROM PT1 AND PT3.
10. TRIM CIRCLE TO THE TANGENTS.
11. U SLOT BEND RELIEF IS THE TANGENT LINE FROM PT1, ARC SEGMENT AND THE TANGENT LINE TO PT3.

FIG. 12

TEARDROP BEND RELIEF

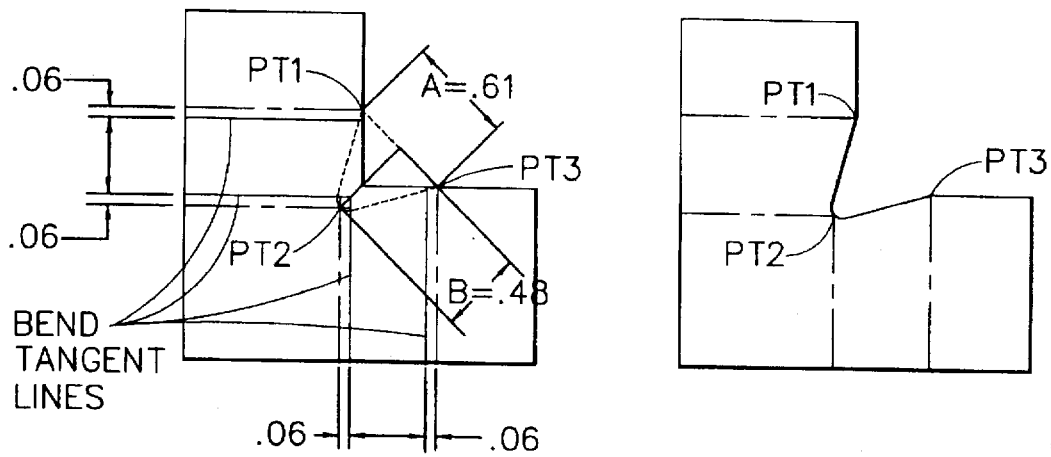

RULES:
1. CONSTRUCT LINES AT A CONSTANT OFFSET OF 0.06" FROM BEND TANGENT LINES.
2. INTERSECT THESE OFFSET LINES WITH FLANGE EDGES OR WITH ANOTHER OFFSET LINE IN CASE OF TWO BENDS ON THE SAME FLANGE TO GET PT1, PT2, AND PT3.
3. JOIN LINE PT1-PT3 ( LENGTH = "A" ).
4. DROP PERPENDICULAR FROM PT2 TO LINE PT1-PT3. ( LENGTH = "B" ).
5. "A" SHOULD BE LESS THAN "B" FOR TEARDROP BEND RELIEF.
6. DRAW CIRCLE AT PT2 DIAMETER IS A MAXIMUM OF TWICE THE THICKNESS AND 0.06" THE CENTER IS ALONG THE PERPENDICULAR.
7. DRAW IMAGINARY LINE THROUGH PT2 AND PARALLEL TO THE LINE PT1-PT3.
8. CIRCLE IS TANGENT TO THIS IMAGINARY LINE.
9. DRAW TANGENTS TO CIRCLE FROM PT1 AND PT3.
10. TRIM CIRCLE TO THE TANGENTS.
11. TEARDROP BEND RELIEF IS THE TANGENT LINE FROM PT1, ARC SEGMENT AND THE TANGENT LINE TO PT3.

FIG. 13

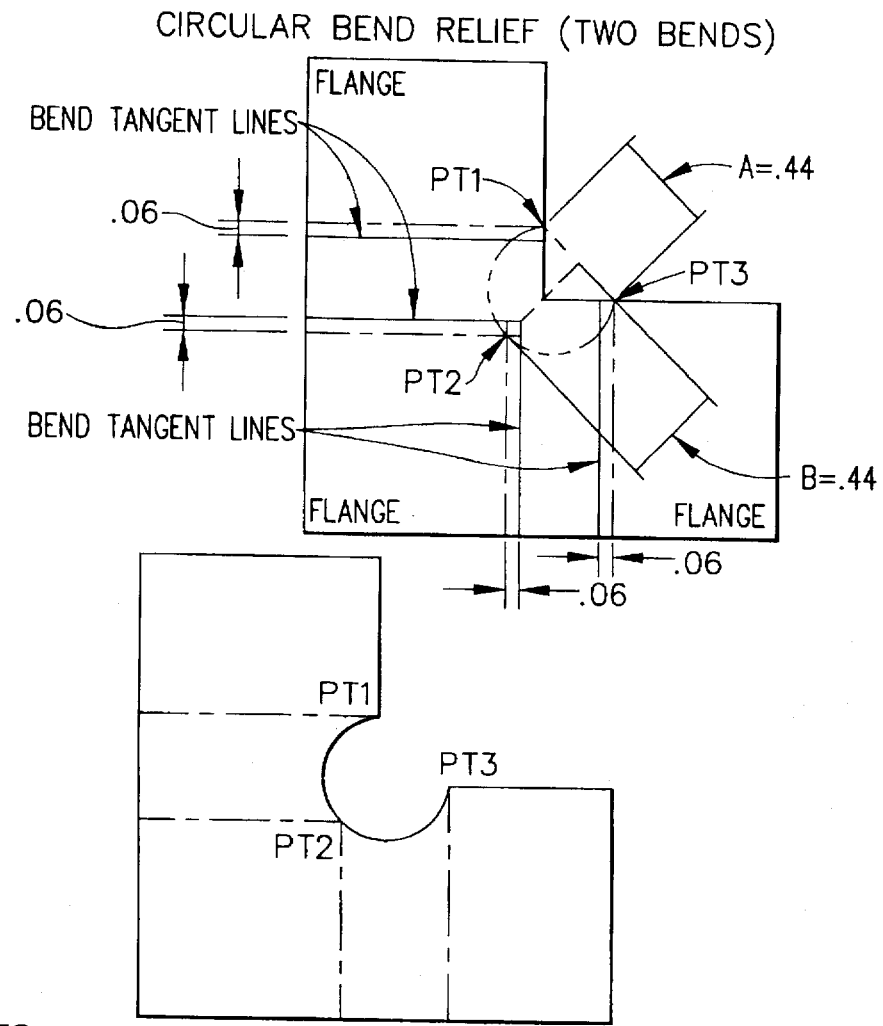

CIRCULAR BEND RELIEF (TWO BENDS)

RULES:
1. CONSTRUCT LINES AT A CONSTANT OFFSET OF 0.06" FROM BEND TANGENT LINES.
2. INTERSECT THESE OFFSET LINES WITH FLANGE EDGES OR WITH ANOTHER OFFSET LINE IN CASE OF TWO BENDS ON THE SAME FLANGE TO GET PT1, PT2 AND PT3.
3. JOIN LINE PT1-PT3 ( LENGTH = "A" ).
4. DROP PERPENDICULAR FROM PT2 TO LINE PT1-PT3. ( LENGTH = "B" ).
5. "A" SHOULD BE EQUAL TO "B" FOR CIRCULAR BEND RELIEF.
6. DRAW CIRCLE THROUGH THREE POINTS PT1, PT2 AND PT3
7. CIRCULAR BEND RELIEF IS CIRCLE BETWEEN PT1 AND PT3.

FIG. 14

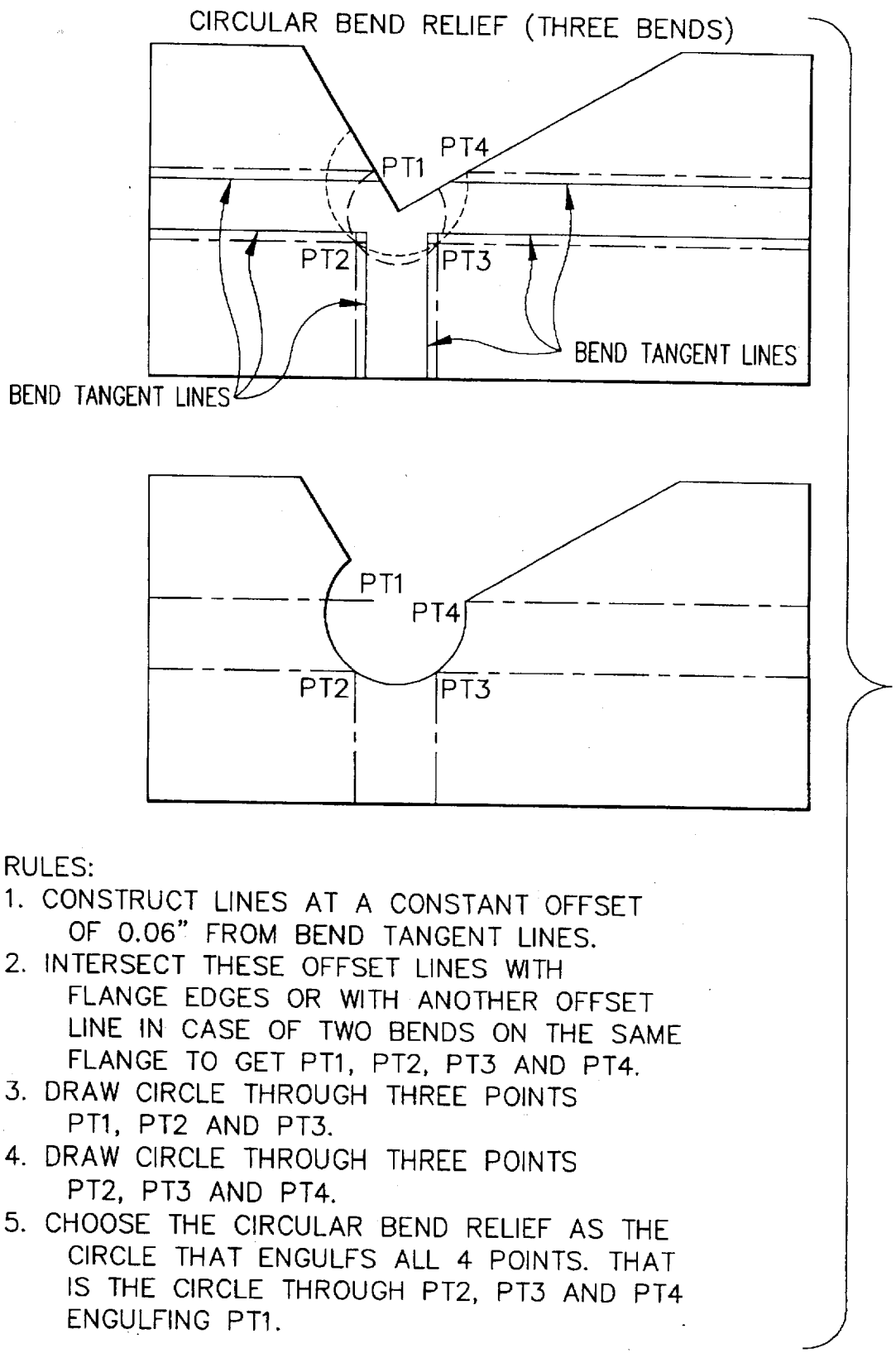

RULES:
1. CONSTRUCT LINES AT A CONSTANT OFFSET OF 0.06" FROM BEND TANGENT LINES.
2. INTERSECT THESE OFFSET LINES WITH FLANGE EDGES OR WITH ANOTHER OFFSET LINE IN CASE OF TWO BENDS ON THE SAME FLANGE TO GET PT1, PT2, PT3 AND PT4.
3. DRAW CIRCLE THROUGH THREE POINTS PT1, PT2 AND PT3.
4. DRAW CIRCLE THROUGH THREE POINTS PT2, PT3 AND PT4.
5. CHOOSE THE CIRCULAR BEND RELIEF AS THE CIRCLE THAT ENGULFS ALL 4 POINTS. THAT IS THE CIRCLE THROUGH PT2, PT3 AND PT4 ENGULFING PT1.

FIG. 15

A TYPICAL NUTPLATE

SELECTION VARIABLES AND THEIR VALUES AS AVAILABLE
IN THE FRONT END ASCII FILE:

BOLT=.250-28, FLOAT=FLOAT, LUBE=DRYFILM, PROGRAM=ANY

PART ATTRIBUTES AVAILABLE:
ICDS_RVDIA=.094
ICDS_RVNO=2
ICDS_THICK=.032
ICDS_RVNO=2
ICDS_NOMEN=NUTPLATE
ICDS_PRTNO=MS21060L4
ICDS_FLOAT=1

OBJECT ATTRIBUTES AVAILABLE ON THE RIVET HOLE EDGES:

ICDS_RIVETHOLE=1

SYSTEMS AND METHODS FOR AUTOMATED BRACKET DESIGN

This application is a Continuation of application Ser. No. 08/575,372, now abandoned filed Dec. 20, 1995.

FIELD OF THE INVENTION

This invention relates generally to gas turbine engines and more particularly, to automated design of brackets to be attached to such an engine.

BACKGROUND OF THE INVENTION

Sheet metal brackets are designed to mount tubing and other accessories to a gas turbine engine. The brackets are bent into shape from a flat pattern and may be made from a single piece or the bracket may include welded gussets or braces. The bracket complexity may range from a single bend with no welds to up to about twenty bends with numerous welded gussets and bend reliefs. Nut plates, clips and spacers may also be welded or riveted to the brackets.

Brackets currently are designed in three dimensions using computer aided design (CAD) systems. Typically, the bracket design is done integrally with the design of tubes to be supported by the bracket. In order to design the brackets, all background geometry must be included in the CAD design layout. The location of the bracket is determined by the structural and vibratory requirements of the system.

Initially, a three dimensional (3D) solid bracket is designed by establishing planes that interface with mounting points on the tubes and on the engine. These planes are intersected to determine bend locations. A solid bracket is then modeled in position, with or without bends, and refined considering design, strength, rigidity and accessibility. Other features such as nut plates, clips and spacers are then added to the bracket model.

The 3D solid bracket model is unfolded to a flat pattern to check for producibility and further design. Bend reliefs as well as tapered edges through bends are designed in the flat pattern, and minimum material condition checks are conducted. This solid flat pattern model is then folded to form a 3D solid bracket. Weld gap size is checked on the folded bracket model.

The CAD software used in performing such tasks is generic in that such software is basic design aiding software with no functionality necessarily unique to bracket design. Certain aspects of bracket design, however, are unique and the required functionality is not readily provided in the known generic software. As a result, use of known CAD systems for bracket design is time consuming and error prone.

It would be desirable to provide an automated system specifically configured for aiding in the design of brackets for gas turbine engines, and specifically for gas turbine engines used in aircraft and marine applications. It also would be desirable to provide such a system which includes functions that simplify and speed up the design and detailing of such brackets.

SUMMARY OF THE INVENTION

These and other objects may be attained by an interactive configuration design system (ICDS) for bracket design which, in one form, is implemented as a user function sub-system to the Unigraphics CAD/CAM software commercially available from the Unigraphics Division of Electronic Data System. The design system, in the one form, may be implemented on a UNIX workstation such as the HP 9000/750 Workstation.

The system includes a part model library having data relating to standard fittings and fitting attributes. The system also includes a drawing note library having a note matrix. A utility program retrieves and supplies information to both the part model library and the drawing note library. The utility program is composed of a number of modules which include bend/unbend routines, design rules, note logic, attribute addition, hardware positioning, and drawing creation.

In operation, the system user supplies information such as face selection, part location and other attributes when prompted by the utility program. With such inputs, the system generates and outputs a bracket master model and detail drawings.

BRIEF DESCRIPTION OF THE DRAWINGS

FIG. 12 illustrates a U-slot bend relief and rules.

FIG. 13 illustrates a tear drop bend relief (two bends) and rules.

FIG. 14 illustrates a circular bend relief (three bends) and rules.

FIG. 15 illustrates a circular bend relief and rules.

DETAILED DESCRIPTION OF THE DRAWINGS

The subject ICDS bracket system, in one form, is implemented as a user function sub-system to the Unigraphics CAD/CAM software (UG), which is commercially available from the Unigraphics Division of Electronic Data Systems. The system, in the one form, is implemented in 'C' programming language and has a Motif based interface following Unigraphics V10 conventions. The bracket system could be implemented on, for example, a HP 9000/750 Workstation configured with HP-UK Version 9.03, an ANSI C Compiler-HP-UX9.03, a HP-UX X-Motif Tool kit V1.2 and Unigraphics 10.3.

Of course, the present ICDS bracket system could be implemented in many other environments. Although the following detailed discussion describes the subject system in the Unigraphics environment, it should be recognized that the system could be implemented in other known environments.

With respect to the one embodiment, the system communicates with users through dialogs similar to the motif based user dialogs of UG. The name of all the iconic dialog items by clicking the third mouse button on them. When UG single entity selection dialog is used by the bracket system, a confirmation dialog is used with the entity highlighted in the graphic screen. The UG single entity selection function cannot select groups and components. When the system needs to select groups or components, the UG class selection functions is used.

Figure 1:
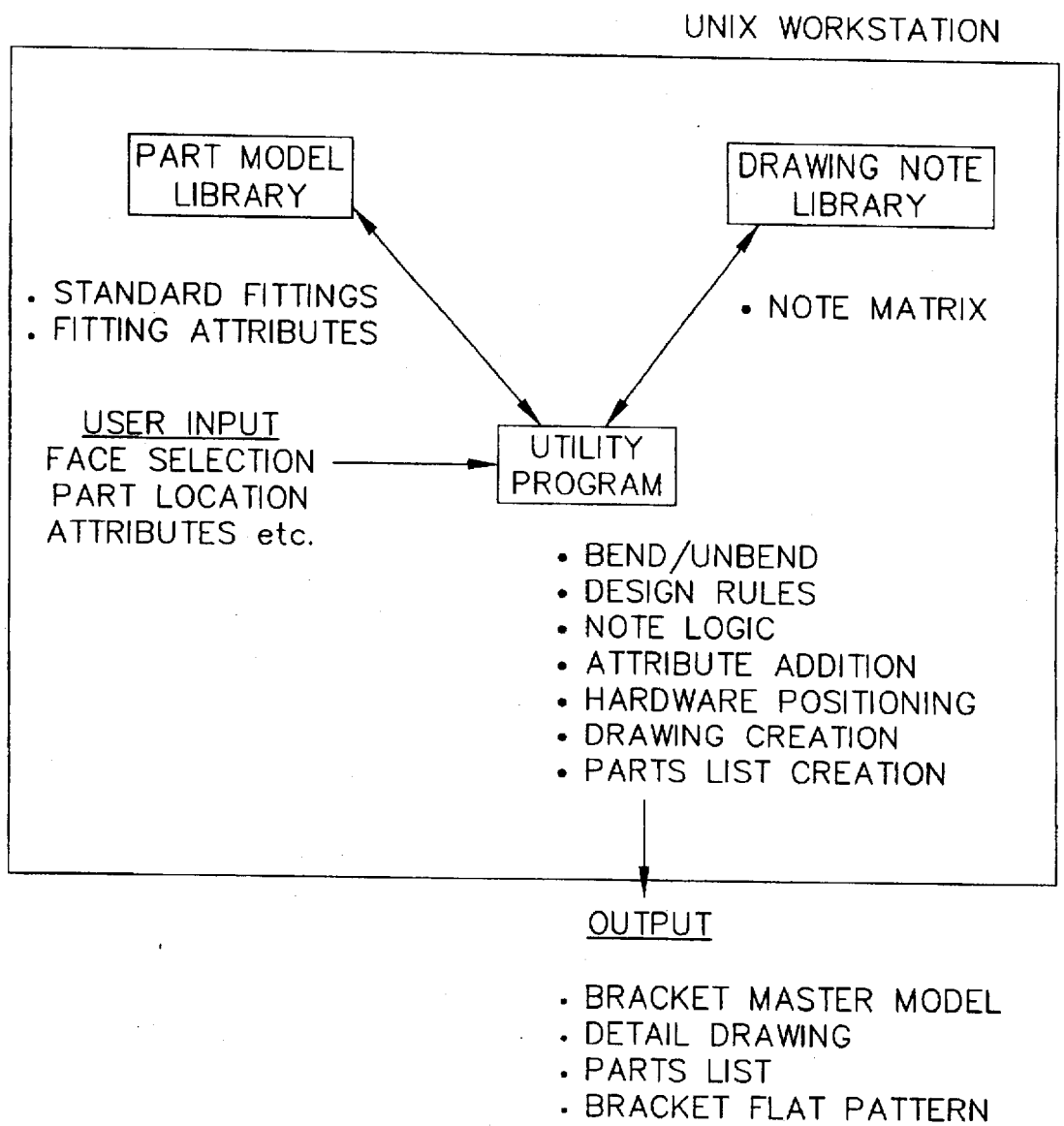
FIG. 1 is a block diagram illustration of an embodiment of a bracket design system in accordance with one embodiment of the present invention.

Referring specifically to FIG. 1, and as described above, the system may be implemented on a UNIX workstation such as the HP 9000/750 Workstation. The system includes a part model library having data relating to standard fittings and fitting attributes. The system also includes a drawing note library having a note matrix. The utility program is coupled to retrieve and supply information to both the part model library and the drawing note library. The utility program is composed of a number of modules which include bend/unbend routines, design rules, note logic, attribute addition, hardware positioning, and parts list and drawing creation. Each of these operations is described below in more detail.

The system user supplies information such a face selection, part location and other attributes when prompted by the utility program. With such inputs, the system outputs a bracket master model, bracket flat pattern, parts list and detail drawings.

The block diagram in FIG. 1 is an overview of the bracket design system. The following description relates to the bracket design program structure, including a detailed discussion of each module.

Program Structure

The bracket geometry supplied to the utility program is a model created in UG. The model can be any one of the following types:

1. 3-D folded solid with bends and other features,
2. 3-D folded solid with no bends (i.e. sharp corners) but with other features,
3. A combination of 1 and 2,
4. 3-D unfolded (flat pattern) with certain features like holes, or
5. 2-D flat pattern wireframe geometry with small end to end discontinuities.

The solid bracket does not have any of the assembly parts united (booleaned) on it. The assembly pans are available separately as different entities.

All data generated will reside in the same part file that the user uses to initiate processing. No extra files are created other than the run time scratch files that are deleted once the user exits.

All the parameters/variables having some default values are stored in a separate ASCII file called the "defaults file". This file is under the directory "misc" in the directory structure. All the defaults are picked up from this file. If the system manager edits and changes any value in this file, the run time defaults will change accordingly. The defaults in this file, in one embodiment, are:

| | |
|---|---|
| bend_radius_by_thickness | 2 |
| bend_radius_round_off | 1/16 |
| bend_angle | 90 deg |
| bend-angle-round_off | 0.5 deg |
| minimum_material_tolerance | 0.2" |
| weld_corner_gap | 0.015" |
| weld_flange_gap | 0.03" |
| destination_layer | Current Layer |
| color | Current |
| assembly_number | G01 or next available |
| notes_top_space | 1" |
| notes_bottom_space | 1" |
| notes_right_space | 1" |

The text used to display the menus and the associated text that will appear in the Unigraphics (UG) Prompt and Status Line are in a separate ASCII file and calls are made to this file for display during the program execution. All the error messages displayed during the execution are stored in this file for similar flexibility.

The menus displayed are motif windows using the standard widget set such as toggle/radio buttons for "on/off". The menus follow UG dialogue box conventions as closely as possible. Typical button labels at the bottom of each menu are "ok", "cancel" and "back" as in standard UG. Mouse button two will perform the same action as "ok". The menu option Exit represents the functionality of the program to return to the previous menu and is represented as the "back" button on the dialogue box.

The program runs as an internal UFUNC program and once invoked from inside a UG session, a dialogue box containing the main menu is displayed. The user then selects and executes any of the modules available as menu selection at this stage. Selection of Exit terminates the program execution and take the user back to base UG.

The functions are divided into four sections, namely:
Bracket Design,
Bracket Assembly and Detailing,
Flat Pattern Wireframe Preprocessor, and
Weld Gaps Healing.

Each of these sections has sub-modules, and each of these sub-modules has an Exit that brings the user to the previous menu. Most of these sub-modules also have an Undo functionality for the user to return back to the state that existed before the user entered that specific sub-module. All that was created in that sub-module is discarded. If the user selects "Undo" without executing/creating anything in the module, then an error message is displayed and no action is taken.

Whenever the user is prompted to select a UG entity during execution, the UG entity selection menu is available with the entity selection mask set appropriately. If any entity is in such a state that the part must be zoomed or rotated, then the user performs these actions from the "View→Zoom" or "View→Rotate" function in the Base UG. All text entities created on the drawings in the corresponding modules (drawing format and title block annotation, item balloon/label generation and placement)and notes selection and placement) use fonts available within UG.

In addition to the bracket design, assembly and detailing software modules, a notes package report writer program runs separately. This module uses UFUNC of UG and creates a report of the various notes from the notes package files available for the Bracket Design, Assembly and Detailing modules as drawing sheets in a UG part file. The output of this program is a postscript file containing the report.

The user archives the part file by using the Base UG "Save" or "Save As" menus. Only run time scratch files are created and these are deleted once the user exits.

Once a folded and an unfolded model are both created in the part file, a conistency table is created as described below in more detail. If the user performs some operation (e.g., changing of bend radius, changing of bend angle, altering geometry of any flange such that it changes the topology of the bracket), then the consistency tables indicate that the folded and unfolded models are not synchronized. The consistency is checked both at the stage of exiting from the main menu as well as at the time of starting. If the folded and unfolded models are not synchronized, an error message is displayed and the user is given an option whether to continue or stop.

The following environment variable is used to set the path to the directory containing all the data required by the program during its execution:

$UGII_ICDS_BDD

Figure 2:
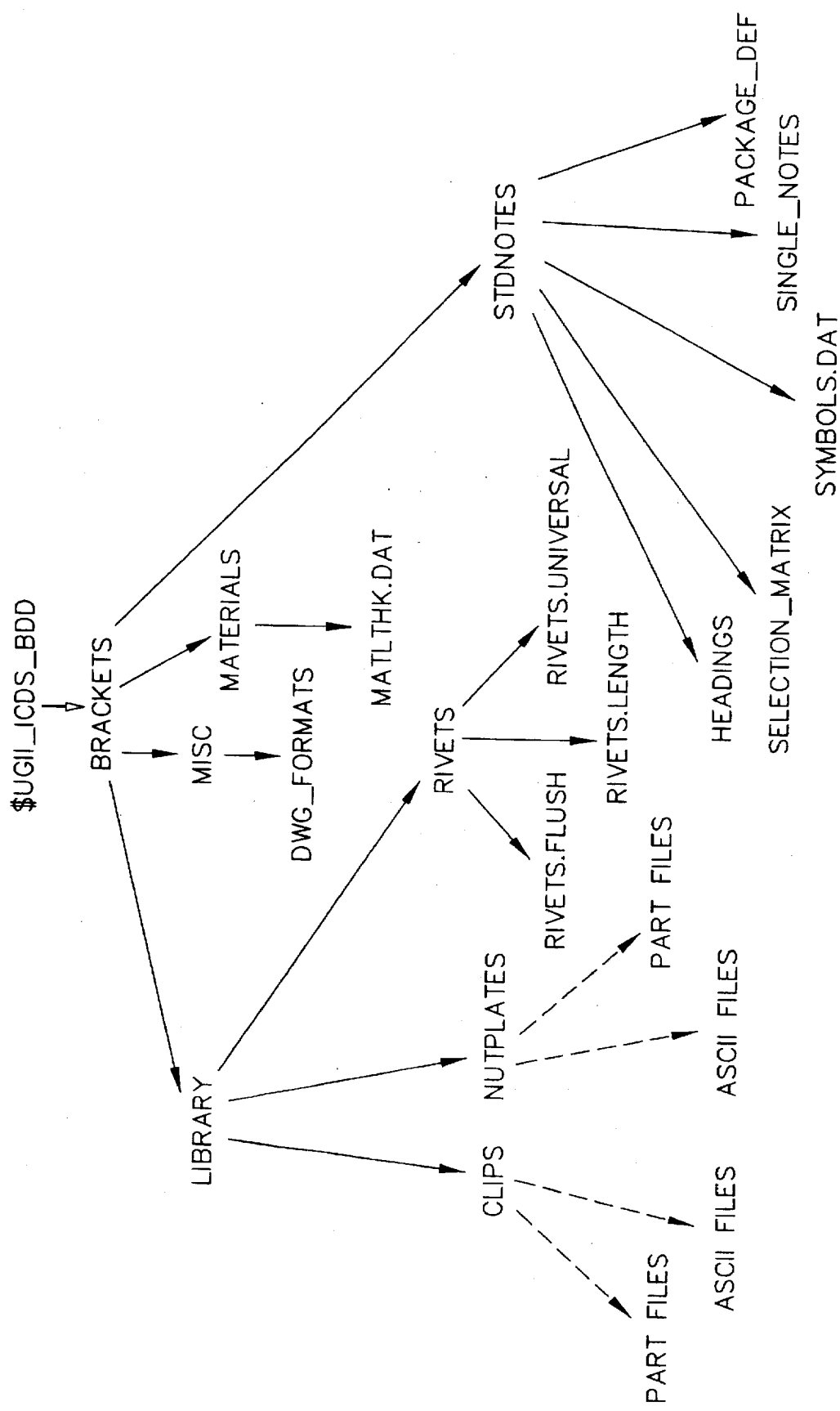
FIG. 2 illustrates the directory structure and environmental variable of the bracket design system.

The directory this variable points to and the structure of this directory is shown schematically on FIG. 2.

The following detailed discussion describes each module in more detail. Specifically, the following discussion describes the Bracket Design, Bracket Assembly and Detailing, Flat Pattern Wireframe Preprocessor, and Weld Gaps Healing modules. Flow chart illustrations showing the specific step by step processing for one embodiment of each module are referenced in the following descriptions. The flow charts are substantially self-explanatory, and the following detailed discussions are directed to such flow charts. It should be recognized, of course, that each step shown in the flow charts may not be specifically addressed below, such steps are part of one embodiment of the referenced processing routines. Other step by step implementations of such routines are, of course, possible.

Bracket Intelligence Builder

Figure 3:
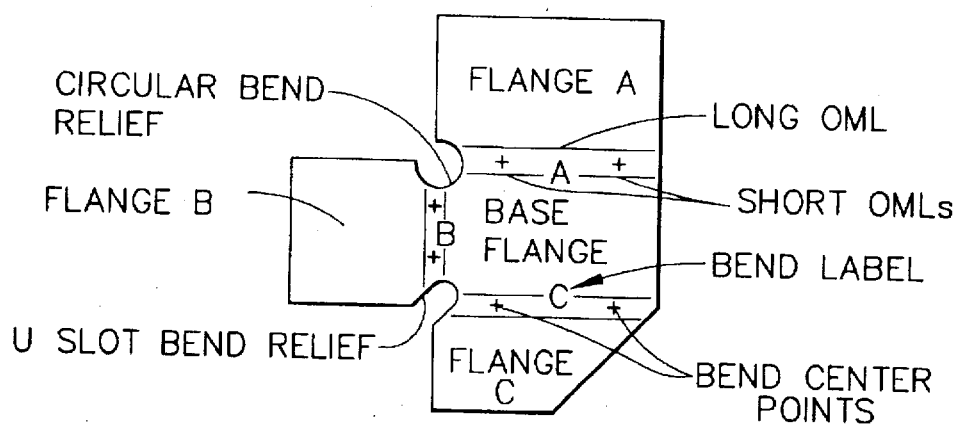
FIG. 3 is a typical bracket flat pattern.

The bracket intelligence builder module receives a solid bracket (with or without modeled bends) or a solid flat pattern of a bracket (essentially the output from the Flat Pattern Wireframe Preprocessor or a previously unfolded bracket) as input and builds intelligent features such as flanges, bends, stock thickness and material type. A typical bracket flat pattern is shown in FIG. 3. The module creates and maintains all the intelligence data for use by subsequent modules.

Some operations within base UG may corrupt the intelligence. Under such eventualities, the system prompts the user to build the lost intelligence again. The Base UG operations that will not corrupt the intelligence include:

Boolean Subtraction
Creating features like Holes & Slots
Trimming a Solid (Not Splitting)
Flange Extensions The output of the module is a folded solid bracket or a solid flat pattern bracket containing all the intelligence required for subsequent modules.

Figure 4:
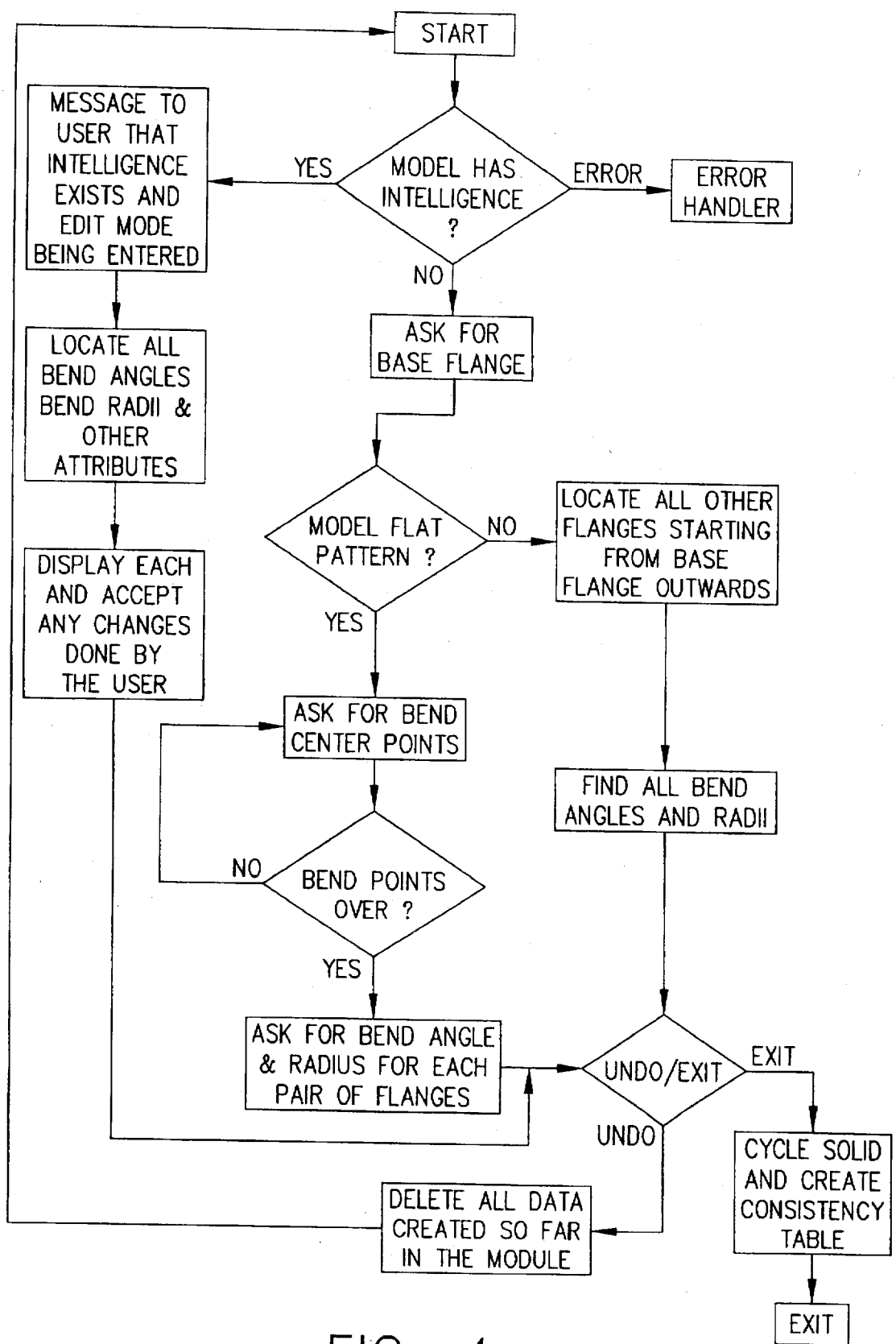
FIG. 4 is a flow chart illustrating process steps for the bracket intelligence module.

FIG. 4 illustrates a sequence of process steps executed in connection with the bracket intelligence builder module. Specifically, and once operations are started, the module first determines if the model has intelligence. If the input model does not have intelligence, the user is prompted to pick the base flange of the solid (folded or unfolded bracket). The UG entity selection menu is provided with the mask set to select faces only. The flange chosen must be a planar flange. If the user selects any non planar face, an error message is displayed and the user reselects the flange. The solid chosen (based on this face) is checked for intelligence.

If intelligence is present, then it is assumed that the user wants to edit the intelligence data and a message that the user is attempting to edit existing data is displayed. The module has an option for displaying the intelligence of the solid chosen. If the intelligence is present, then it will be listed out in the UGs listing device.

If no intelligence is present, then a message regarding this status is displayed. This option is helpful to the user when the folded or unfolded model of the bracket looses its intelligence. The user can select the corresponding unfolded or folded solid that has not lost its intelligence and get all the information for rebuilding the intelligence on the folded or unfolded solid that lost the intelligence. For example, if solid A is folded bracket and solid B the corresponding unfolded bracket, and if solid A looses its intelligence due to some operations by the user in base UG, then the user can select the unfolded solid B and list out all the intelligence so that the intelligence builder module can be run again for solid A with this information at hand.

If this is the first time the intelligence is being built, then the first action taken will be to make a copy of the solid on to one of the layers designated. All the other layers (other than the designated layers of the software) are not selectable and invisible. The module performs all its further operation on this copied model and will not alter the original.

If the user is in the edit state of the module, then all the new intelligence will be altered on the existing model itself and no copy will be made. During processing, if any intelligence cannot be attached to the solid because the user has picked up a solid body that cannot be identified as a bracket, then an error message is displayed and processing returns to the initial menu.

When the solid chosen has no intelligence, the thickness of the selected flange is determined. The flange thickness is checked against the available stock thickness tolerance ranges stored in the ASCII material data file "matlthk.dat". Based on this stock thickness, the user selects a material from a list of valid material types from the material file. Motif's "option menu" may be utilized for this operation. Processing will not proceed until the user selects a material.

When the solid selected by the user has intelligence, the material type previously identified is displayed. The user is provided with a motif's "option menu" with the options based on the stock thickness already available in the intelligence. The user reselects a new material or accepts the current material.

All the flanges, bends, bend angles, bend directions are referenced in a hierarchial form starting from the base flange. The local Work Coordinate System (WCS) is aligned so that the XY plane lies in the plane of the flange. The original WCS is saved prior to this operation of reorientation of the WCS and restored at the end of the session.

If the user chooses a solid flat pattern, then the user picks each pair of bend centerline points. The UG Point Genetic Menu is provided to aid the user in selecting these points. Each successive pair of bend points is prompted for selection until the user selects Exit. Based on the bend points, the total number of flanges is determined. The user is then queried for the bend angle and bend radius (with defaults) for each pair of highlighted flanges. The bend direction is displayed for each adjacent flange starting from the base flange. A default direction (positive Z) is shown by an arrow, which the user can accept or flip—using a motif pushbutton.

In the case of a folded solid bracket, all the successive flanges and bends located are compared for thickness with the base flange. If any flange or bend has a different thickness, then an error message is displayed highlighting the feature that has an inconsistent thickness. Processing then exits to allow the user to correct the model.

Each pair of flanges is highlighted starting from the base flange. The associated bend radius and bend angle also are highlighted. If the two flanges have no bend modeled between them, then the value of bend radius and bend angle is displayed in textual form. The user may retain the defaults or change them. A change in bend angle or bend radius is used only during subsequent refolding and not during the immediate unfolding of the bracket. The bend direction is evaluated based on the solid model. The default of the bend radius is two (value of the variable bend_radius_by_ thickness as read from the defaults_file) times the thickness of the bracket rounded off to the nearest 1/16 (value of the variable bend_radius_round_off read from the defaults_ file) of an inch. Bend angles are rounded off to the nearest 0.5 degree (value of the variable bend_angle_round_off as read from the defaults_file).

At the end of execution of this module, the user is given an option of either exiting the intelligence builder module or undoing the whole session thus bringing back the model to the stage where the Bracket Intelligence Builder was started. Upon exiting, the module creates a consistency table associated with the solid. The consistency table is used to ensure that the folded and unfolded models are synchronized, as described above.

Bracket Unfolding

The bracket unfolding module receives a solid folded intelligent bracket model as input. Using the intelligence available in the bracket model, the bracket unfolding module unfolds the bracket to its flat pattern state. In addition, short and long outer mold lines and the bend center points are created on the model. The bends are labeled alphabetically on the flat pattern. The bend allowance and bend deductions used are described hereinafter in more detail. The output of the module is an intelligent flat pattern solid model of the bracket.

Figure 5:
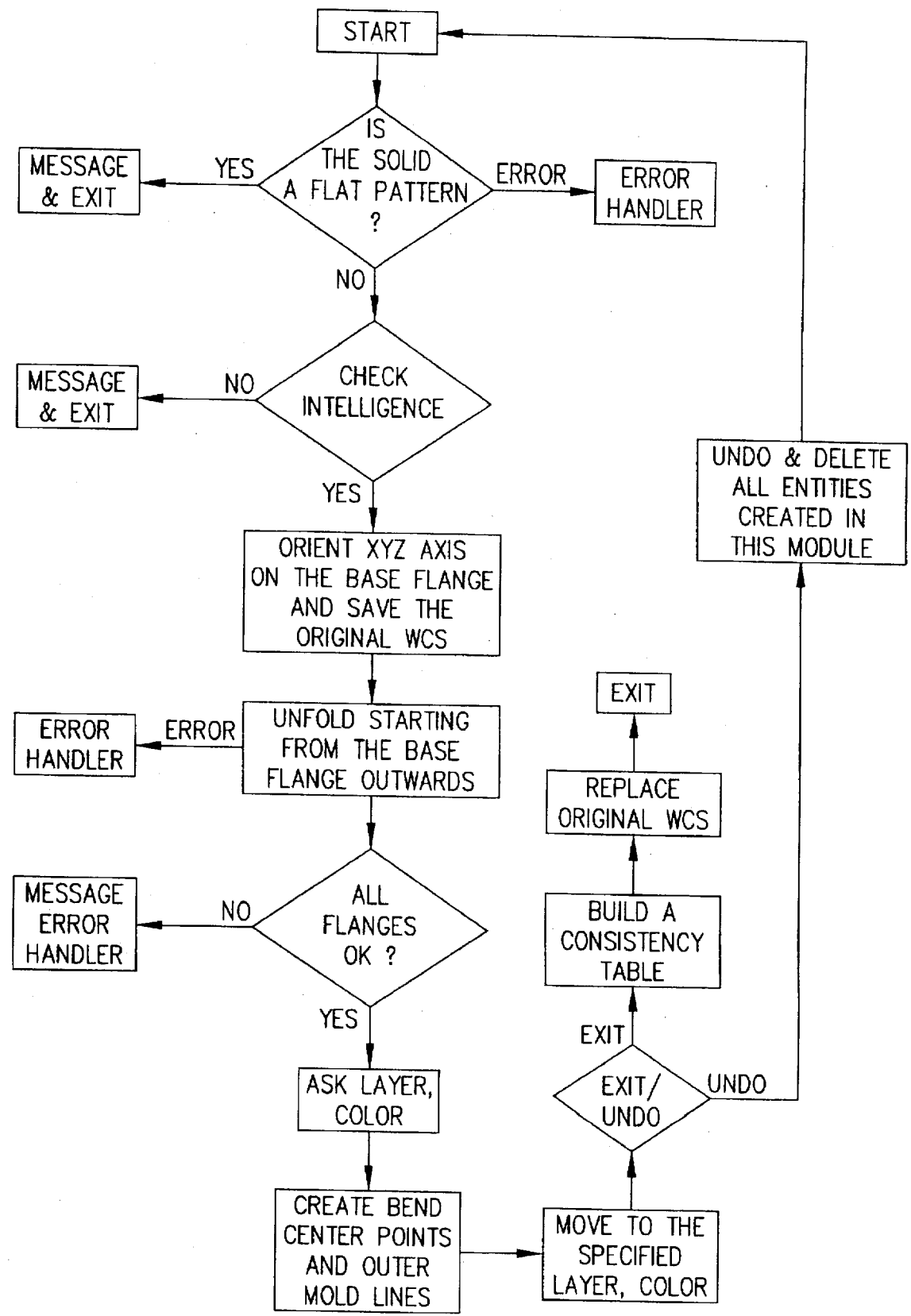
FIG. 5 is a flow chart illustrating process steps for the unfolding module.

FIG. 5 illustrates a sequence of process steps executed in connection with the unfolding module. Specifically, the user is prompted to pick a solid for unfolding. The UG entity selection menu with the mask set as solids only is provided to the user to pick the solid. If the user selects anything other than an intelligent solid folded bracket, an error message is displayed and the user is prompted to reselect the solid.

Processing then proceeds to create a new WCS, after saving the old WCS, that is oriented in the plane of the base flange. Using the bend angles and bend radius along with the material thickness, the adjacent flanges are unfolded. This process will continue until all the flanges are unfolded. If overlapping flanges are detected, an error message is displayed and the overlapping flanges highlighted.

If the flange width in the flat pattern is equal to the sum of the two end radii, then this would be a case of a double bend or a 'S' bend depending on the direction of the two bends. This flange is no longer stored as a flange but as a double or "S" bend. Also, in case the flange is not planar, it will be unfolded by simple shrinkage value applied to the neutral axis. If the folding of the flange is not circular, then a neutral axis is created and the UG "simplify curve" function is used to simplify the neutral axis into arcs and straight lines and these are unfolded with the appropriate shrinkages taken into account.

The user is prompted for destination layer and color with defaults, to be applied to the unfolded model. The flat pattern is changed to the selected color and moved to the chosen layer. Based on the intelligence built into the model, the module then creates two bend center points per bend, approximately 20% inside of the edge, on the bend center line. Also, the outer mold lines are created per bend—one long outer mold line on the flange that is going to bend relative to its adjacent flange and two short outer mold lines on this adjacent flange. Attributes are assigned to these center points and mold lines. All the bends are labeled alphabetically starting from A and these labels are placed on the flat pattern solid and associated with the bends.

At the end of the module, the user is given an option of either exiting or undoing the whole session thus bringing back the model to its prior state. Upon exiting, a consistency table associated with the solid is created to ensure that the folded and unfolded models are synchronized. The WCS will be placed back where it was before this module started.

Bracket Bend Relief Module

The bracket bend relief module creams bend reliefs in the solid intelligent flat pattern. Both user defined and automatic bend relief creation are performed. The rules for automatic bend reliefs are described hereinafter in more detail. The output of the bend relief module is an intelligent flat pattern with all the bend relief cut outs.

Figure 6A:
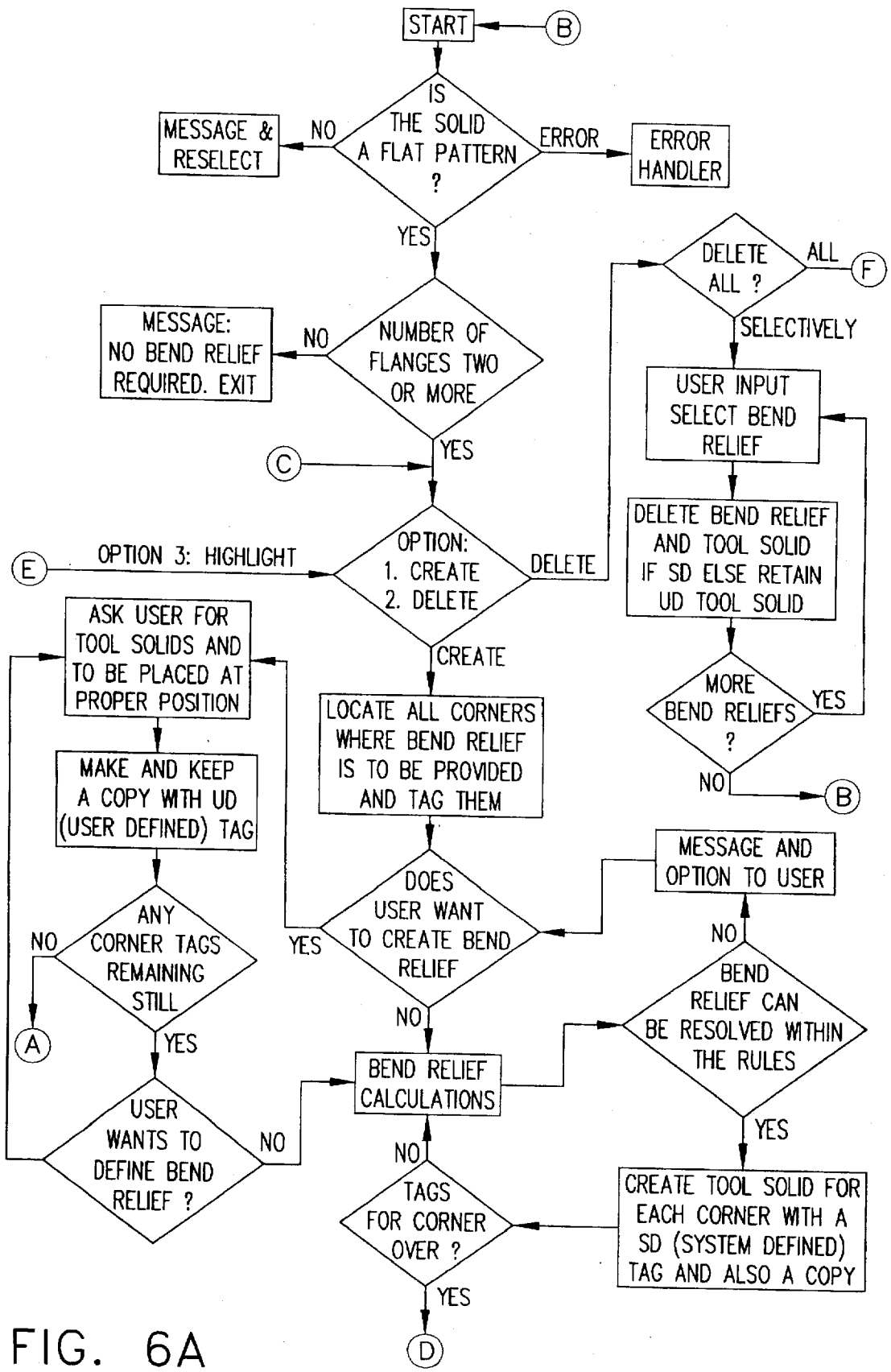
FIG. 6 is a flow chart illustrating process steps for the bend relief module.
Figure 6B:
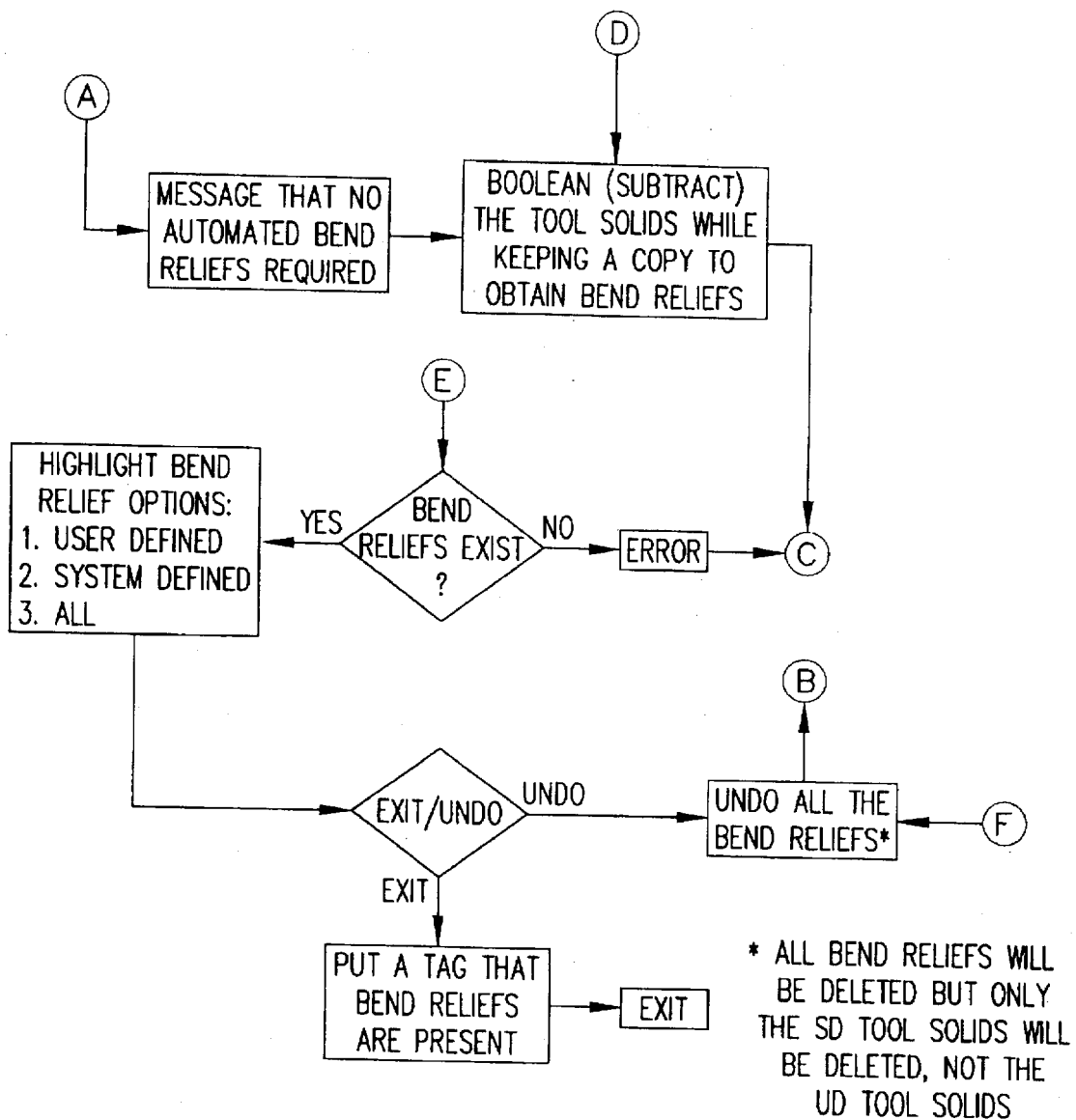

FIG. 6 illustrates a sequence of process steps executed in performing the bend relief. Particularly, the module starts by prompting the user to select an intelligent flat pattern. The UG entity selection menu is provided with the selection mask set to solid only to aid the user in selection. If the user selects anything other than an intelligent flat pattern, an error message is displayed and the user is prompted to reselect the solid.

Three options are provided in module execution. These options are cream bend reliefs, delete bend reliefs, and highlight bend reliefs. In the create mode, the user is prompted as to whether the user wants to create a user defined bend relief. If Yes, then the user is prompted to select the bend relief tool solids so that the bend reliefs can be generated. The user must have created and positioned bend relief tool solids prior to using this option. The UG entity selection menu is provided with the entity selection mask set to solids only.

Next the module cycles the remaining corners and creates the necessary bend reliefs automatically as per the rules. Any corner that does not fall into the category of the automatic bend relief rules is prompted to the user for a tool solid. This is done after all the user defined and the automatic bend reliefs are over. The corners not possible to resolve within the rules are indicated with a highlighted number for easy identification for the user.

Once all the bend reliefs are provided, all the tool solids are stored in the model transparent to the user. This is done to ensure a correct bend relief shape at a later stage when a folded bracket having bend reliefs is unfolded.

With respect to the internal representation of the bend reliefs, each bend relief is identified with a separate identification (ID). The IDs for system defined bend reliefs and the user defined bend reliefs are identified separately. These IDs are utilized internally during the Highlight options of the program.

After creating the bend reliefs, the user can exit to the previous level and access the delete and highlight options or exit from the bend relief module. In the delete mode, options for deleting all or selectively deleting bend reliefs are provided. If the user opts for selective deletion, then the user is prompted to select the bend reliefs to be deleted. For both user defined and automatic bend reliefs, the bend relief feature is removed from the flat pattern. If a user defined bend relief is deleted, then the tool solid is restored.

If the user selects the highlight option, then a further menu choice to either highlight all bend reliefs, highlight all user defined bend reliefs or highlight all system defined bend reliefs is provided. The action taken will be as per the menu item selected. The Exit option returns processing to the previous menu.

On the base bend relief menu, there are two more selections, namely, Undo and Exit. Selecting Undo deletes all that has been created in this module and brings the model back to the state where it was when started. Selecting Exit takes the user back to the previous menu.

The following explanation of Bend Deduction, Bend Allowance, and "J" value is provided to facilitate an understanding of the present invention. More specifically, with respect to Bend Deduction, to determine the dimensions for the outline of the flat pattern to form the bracket shown in FIG. 7, the concept of neutral axis needs to be understood. For example, if a piece of metal 5 inches long and 0.50 inch thick (FIG. 8A) is bent to form a perfect circle (FIG. 8B), the inside circumference would be 3.596 inches and the outside circumference 6.737 inches. This indicates the inside surface compresses while the outside surface stretches. Somewhere between the inside and outside circumferences there is a line which will not change length. This line is approximately 44.7% of the thickness of the material measured from the inside of the bend. It is commonly called the 44% line, or neutral axis. Calculations for bend allowance and bend deduction are based on this line.

The Bend Allowance (BA) is the true flat length of material required to go around a given Bend Radius (BR) for a given number of Degrees (N). This length is measured from the Bend Tangent Line (BTL) to Bend Tangent Line (BTL) along the 44.7% line (neutral axis). The geometrically different surfaces of a part become tangent to each other, creating an abrupt change in radius of curvature, e.g., a plane and a curved surface.

The formula for calculating Bend Allowance is:

BA for one degree=(0.01745329 R+0.0078 T)

BA=(0.01745329 R+0.0078 T)*N

BA=Bend Allowance

R=Bend Radius (inside radius)

T=Material Thickness

N=Angle of Bend in Degrees (bent up angle)

Figure 7:
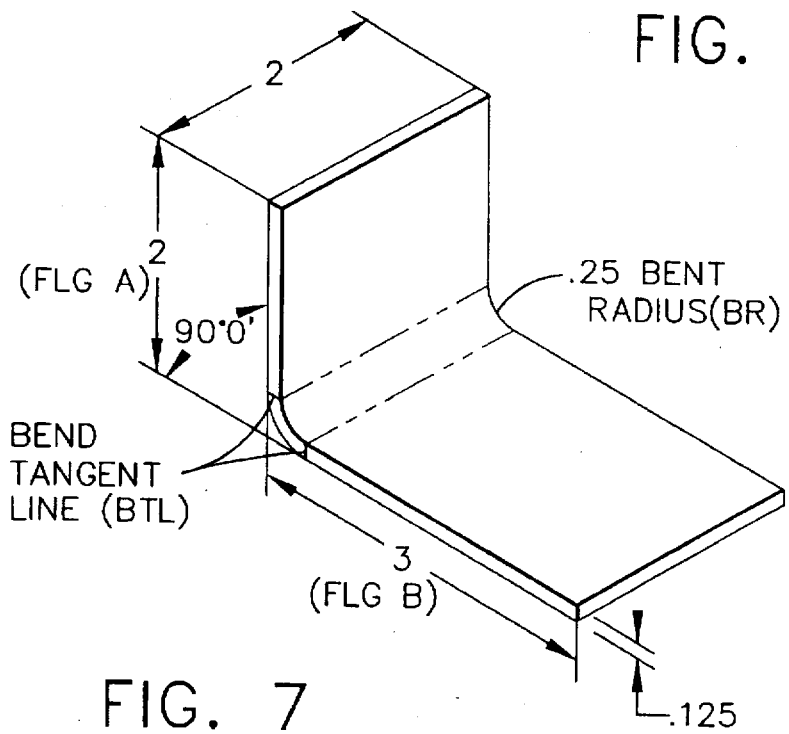
FIG. 7 illustrates a bend deduction operation.
Figure 9:
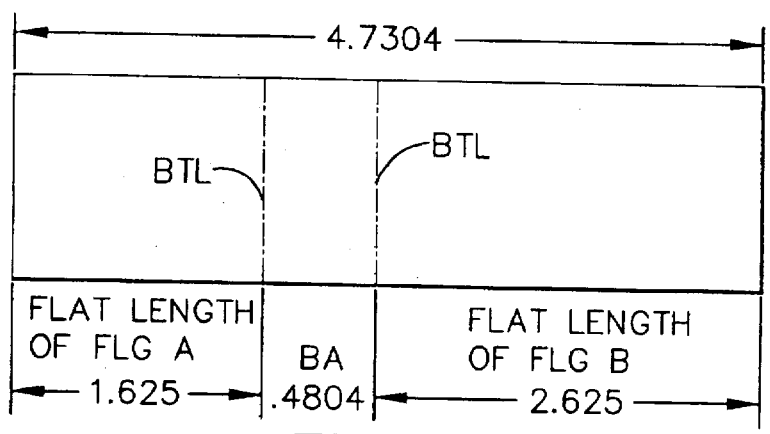
FIG. 9 illustrates a flat pattern.
Figure 8A:
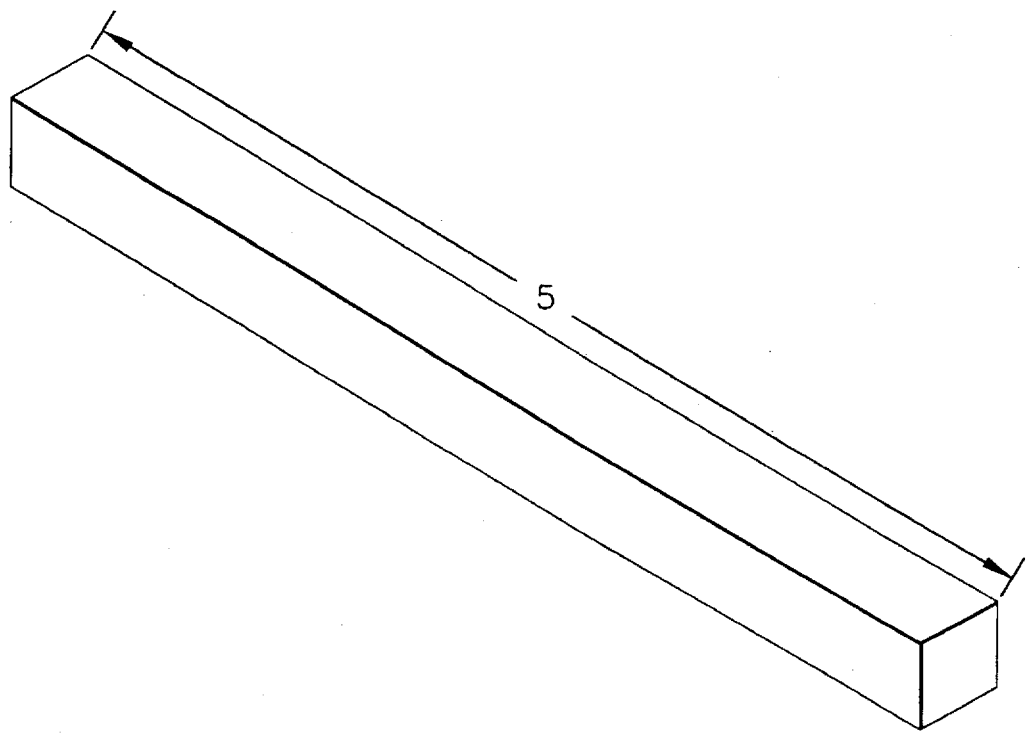
FIG. 8A illustrates a straight piece of metal which is then bent to form a circular shape as shown in FIG. 8B.
Figure 8B:
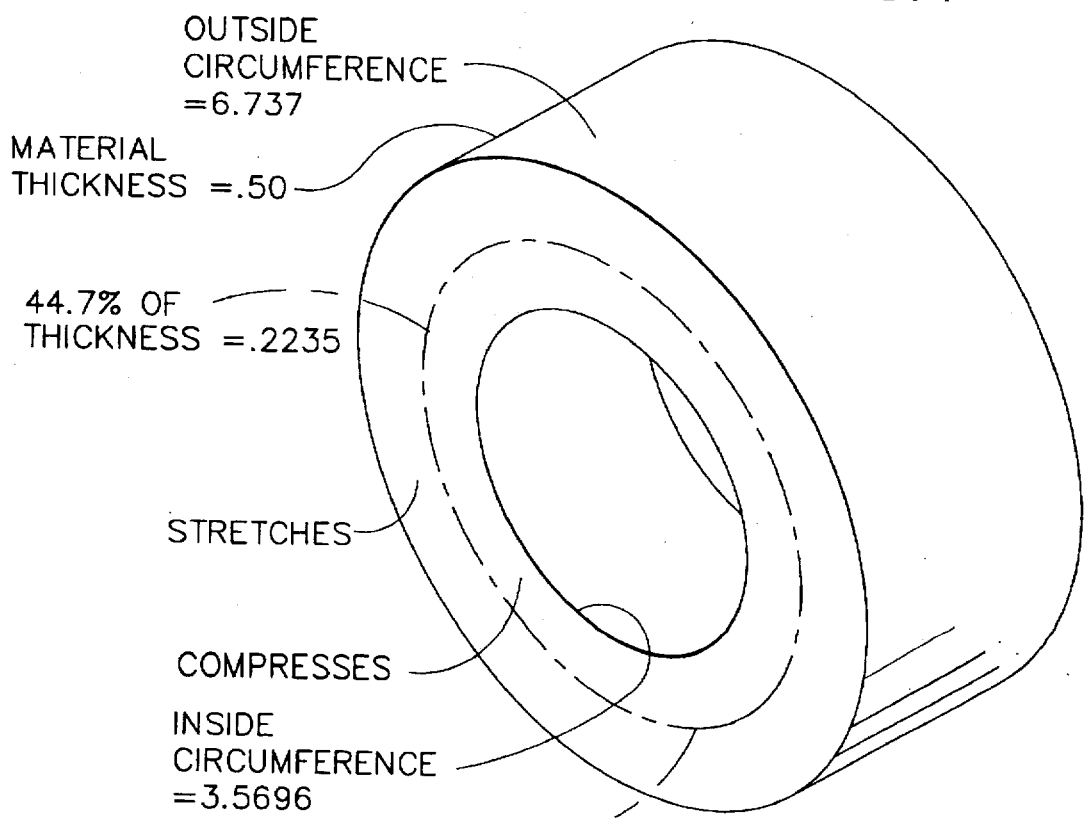

A flat pattern may be developed for the bracket shown in FIG. 7 by connecting the true shapes of all flat areas and formed areas (developed by the Bend Allowance) in their proper sequence as shown in FIG. 9.

Figure 10:
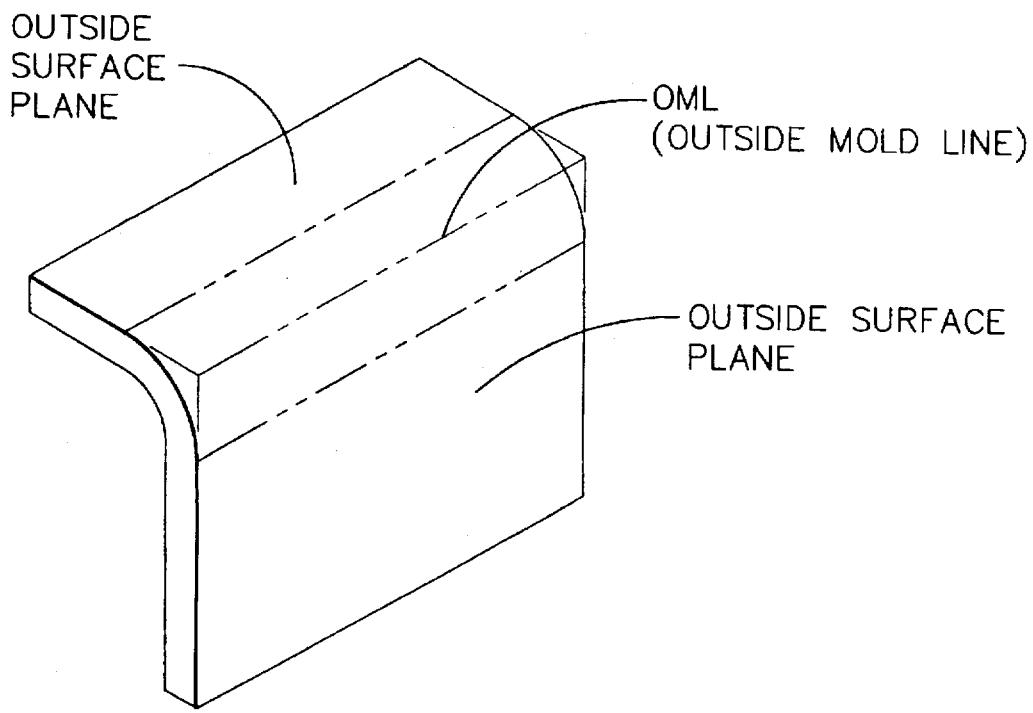
FIG. 10 illustrates a bend deduction.
Figure 11:
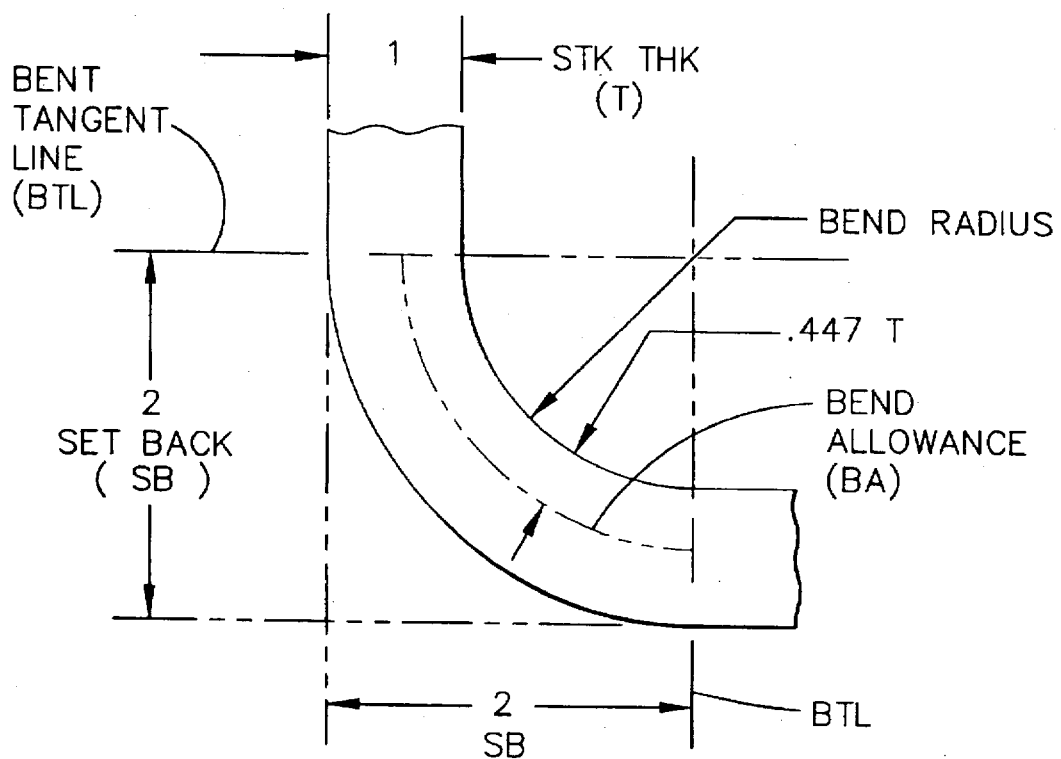
FIG. 11 illustrates the "J" value.

Referring to FIGS. 10 and 11, the "J" value is based on the relationship between the outside surface planes of the formed bracket and the neutral axis. The Outside mold line (OML) is the theoretical intersection of these two planes. The "J" value is given by the following formula:

J=2SB−BA

J=Bend Deduction

SB=Set Back (distance from Bend Tangent Line to the outside Mold Lines)

BA=Bend Allowance

With respect to the rules for various types of bend reliefs, such bend reliefs and the respective rules are illustrated in FIGS. 12, 13, 14 and 15. Particularly, FIG. 12 illustrates a U-slot bend relief and rules. FIG. 13 illustrates a tear drop bend relief and its rules. FIG. 14 illustrates a circular bend relief (two bends) and its rules. FIG. 15 illustrates a circular bend relief (three bends) and its rules.

Bracket Folding

The folding module allows the user to fold/refold an intelligent flat pattern which may or may not have bend reliefs. If the flat pattern has the bend reliefs, then the folded model has as near a representation of the reliefs as possible, but the bend reliefs will not be exact. The output of the module is a folded intelligent solid bracket.

Figure 16:
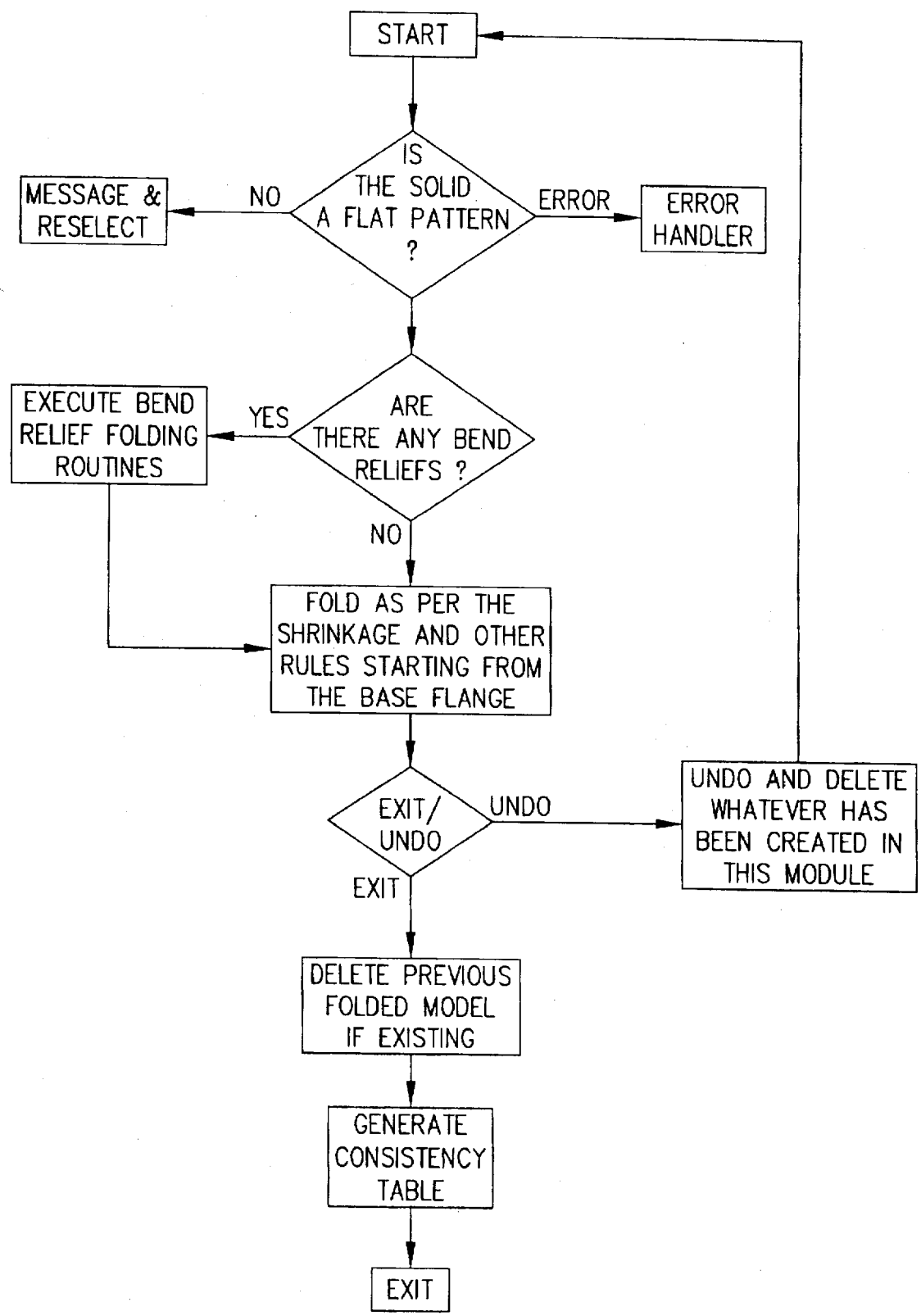
FIG. 16 illustrates process steps for the folding module.

FIG. 16 is a flow chart illustrating a sequence of process steps in for the bracket folding module. Specifically, the user is prompted to select an intelligent flat pattern solid bracket. The UG entity selection menu, with the mask set to solids, is used to aid the user in this selection. The module verifies that the solid is an intelligent flat pattern. If the solid is not a flat pattern, an error message prompts the user to reselect an intelligent flat pattern.

Next, the flat pattern is checked to determine if there are any bend reliefs in the flat pattern. If there are none, then processing skips the routines for generation of the bend reliefs after folding. That is, these routines will only be called if there are bend reliefs.

The base flange with its WCS is the reference point for all the foldings. Each flange is folded according to the bend angles, bend radius and bend direction. This process continues until all the flanges are bent appropriately and all the bend reliefs are performed, if any.

A consistency data table is created to ensure the folded and unfolded brackets are synchronized. The user may then either accept or undo the entire folding process and return to previous menu. If the user accepts the model, by selecting Exit, then the previous folded model, if any, is deleted and a new consistency table is generated. All the intelligence associated with the folded bracket is present at this stage. The bracket is located with respect to its own WCS at this stage.

Bracket Minimum Material Check

The bracket minimum material check module checks the minimum distance between the features in a bracket such as holes, slots, edges and bend tangent lines. This module is available for either the flat or folded state. All the pairs that violate the minimum material condition are highlighted and the distance in textual form is displayed. The output of this module is the highlighted entities and textual dimension for all the pair of features and edges that violate the minimum material check condition.

Figure 17:
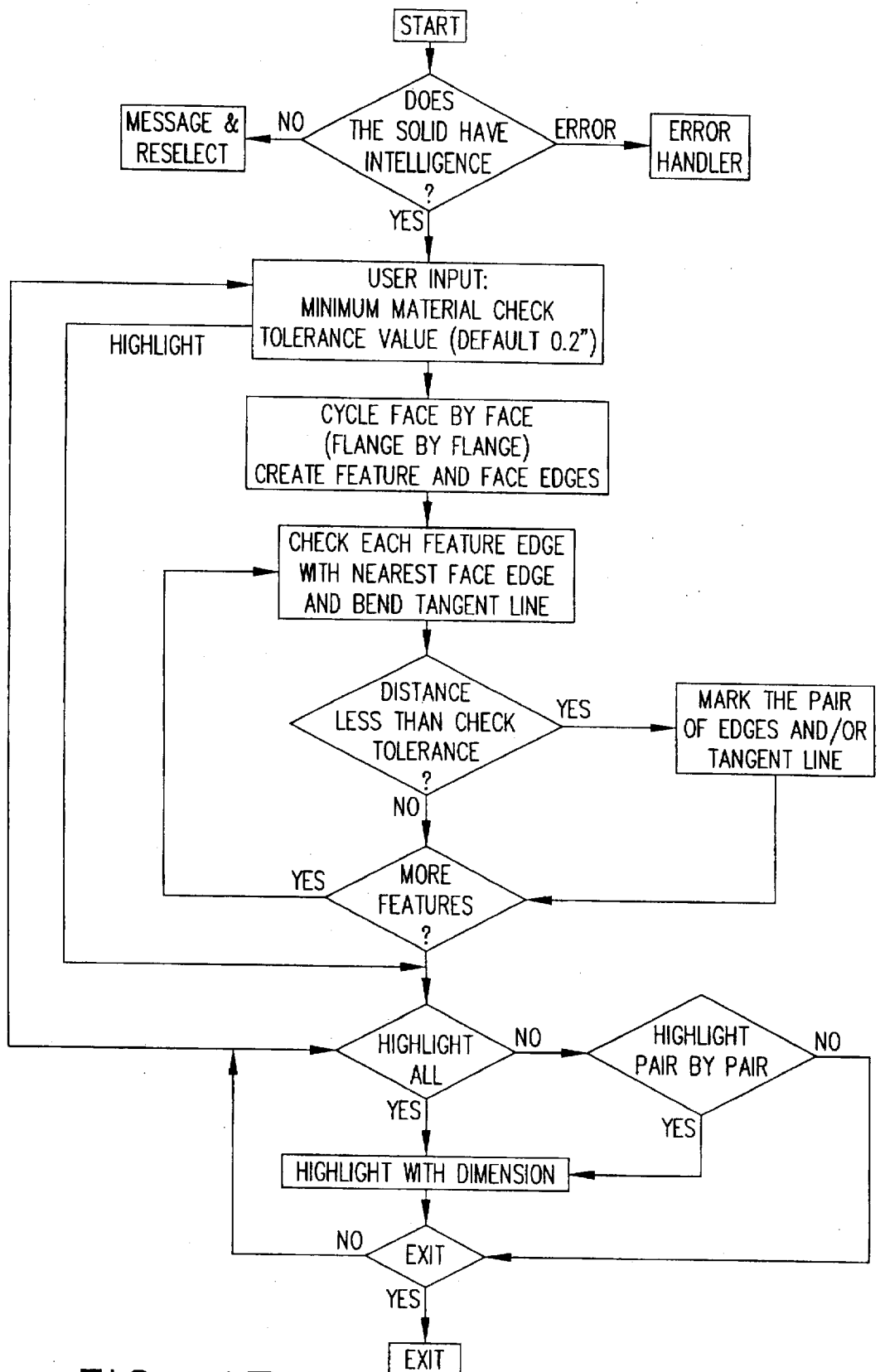
FIG. 17 illustrates process steps for the minimum material check module.

FIG. 17 illustrates a sequence of process steps for the bracket minimum material check module. Particularly, the user is prompted with the "minimum_material_check" value with a modifiable default of 0.20" (this value is based on the value in the defaults_file). The user is then prompted to select the solid (i.e., flat pattern or folded bracket). The UG entity selection menu with the mask set to solids only is available to aid the user. The solid is then checked to verify that the solid is an intelligent bracket. If not, an error message prompts the user to reselect an intelligent bracket.

Processing then proceeds to locate the edges of all the features on each flange. Processing proceeds in a systematic flange by flange manner and checks the minimum distance between each edge of the feature and each edge as well as the bend tangent line of the flange. If the value is less than what has been defined, then that particular pair of edges is highlighted and the actual distance displayed as a temporary dimension. The highlighting could be performed one after another or all the violating pairs shown together, as selected by the user. Processing returns to the previous menu when Exit is selected by the user.

Bracket Weld Gap Check Module

The bracket weld gap check module allows the user to Identify, Set Tolerance and Highlight bracket weld gaps. This module operates on folded brackets. All weld gaps are modeled prior to running this module. The output of the module is highlighted weld gaps non adhering to the tolerance specified.

Figure 18:
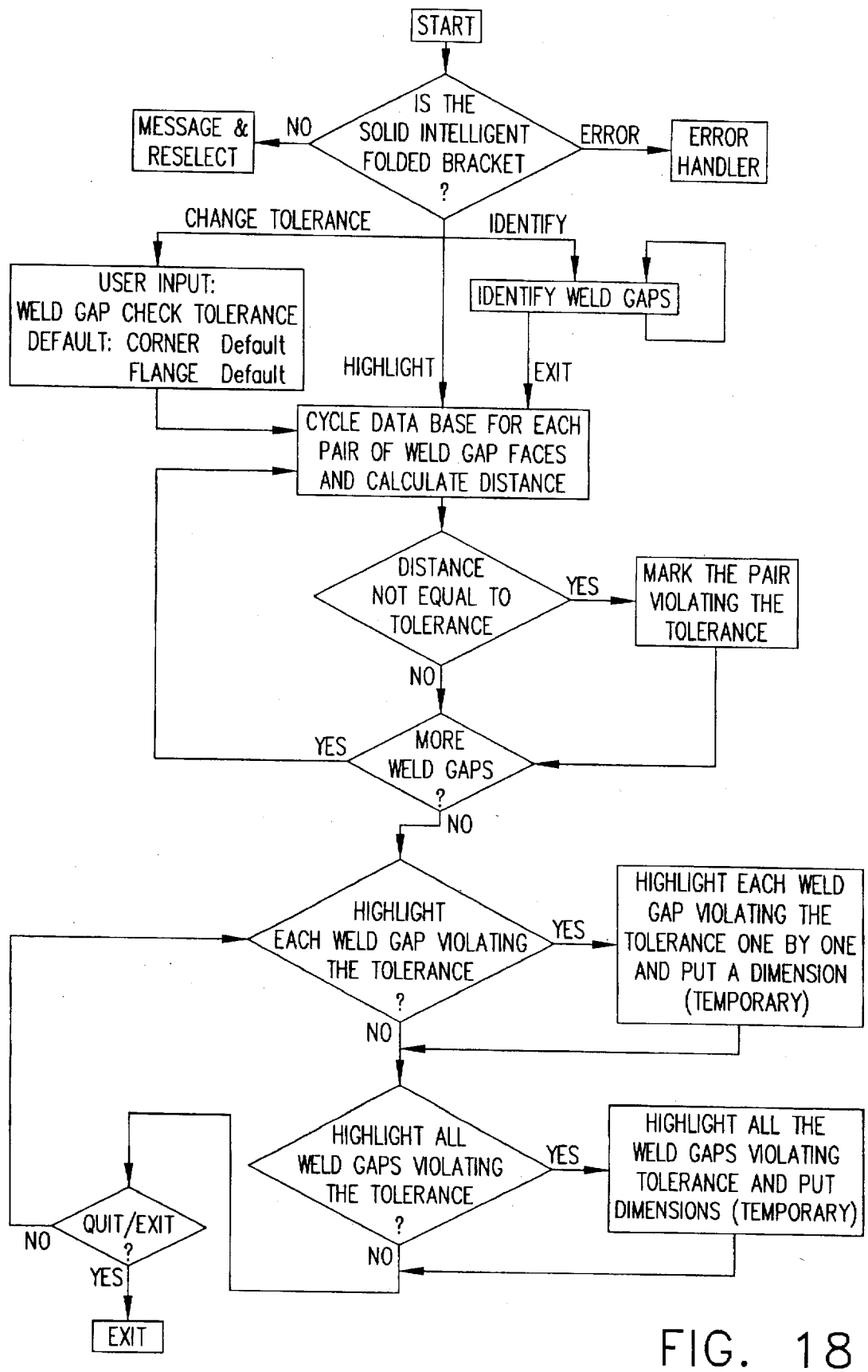
FIG. 18 illustrates process steps for weld check module.

FIG. 18 illustrates a sequence of process steps for the weld gap check module. Particularly, the user is prompted to select a solid. The UG entity selection menu with the entity mask set to solids only is available to assist the user in selection. Processing proceeds only if the solid selected is an intelligent folded bracket. In any other case, an error message prompting the user to reselect the bracket will be displayed.

Next, the user is presented with a menu with the following options: Identify Weld Gaps, Check Weld Gap, Highlight All and Highlight each. If the user selects Identify Weld Gaps, all previously identified weld gaps are highlighted. Then, the user is prompted to select additional pairs of welded faces which are stored for subsequent use as well as to perform the next operation. The UG entity selection menu is provided with the mask set to Face. This operation will keep on looping for as many weld gaps as the user wants to select. Selecting Exit stops the loop and returns the user to the previous menu.

The option Set Weld Gap Tolerance has two cases and each case has its own default. One case is the corner weld which may be either a regular corner or one edge face being welded to a flange face. The second case is a weld between the same flange. The first case has a default value of 0.015" (depending on the defaults file) and the later case has a default value of 0.03" (depending on the defaults file).

Figure 19:
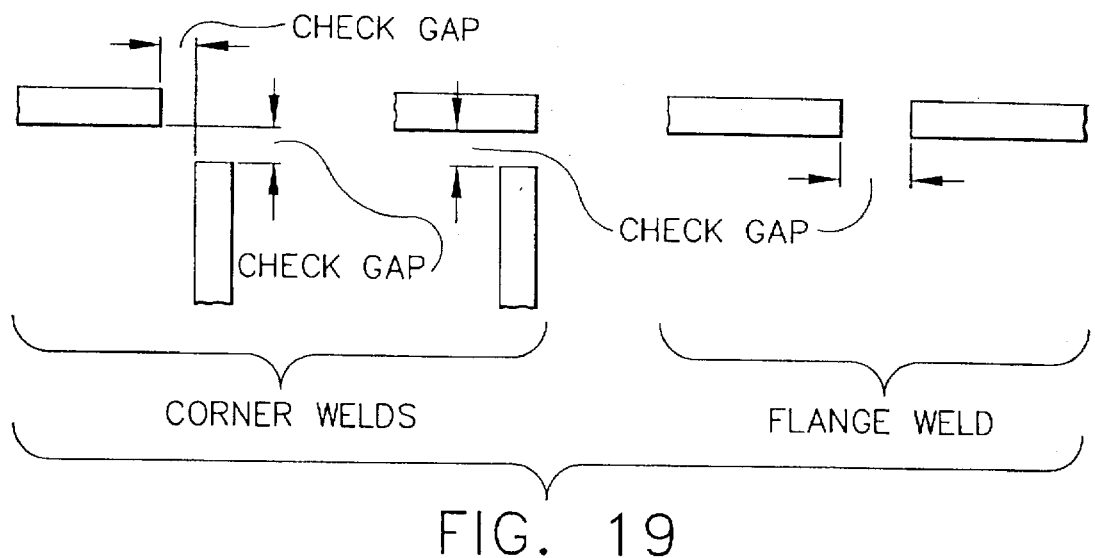
FIG. 19 illustrates different types of weld gaps and checking gaps.

Different weld gaps are illustrated in FIG. 19. The user can change any of the values and the module uses these new values for checking the gaps for highlighting.

The option Highlight all highlights all the weld gaps violating the tolerance gap and places a textual dimension of the actual gap for each. If this option is selected without previously identifying any weld gaps, then an appropriate error message will be displayed.

The option Highlight highlights each of the gaps violating the tolerance gap and places a textual dimension for the actual gap one by one. If this option is selected without identifying any weld gaps, then an appropriate error message will be displayed.

The module exits only when the user selects the Exit option.

Flat Pattern Wireframe Processor Module

The flat pattern wireframe processor module converts the line and arc entities representing a flat pattern wireframe to a solid flat pattern. The entities may not match the precise nature of data storage of UG. If the entities are not lying on the same plane, all the entities are projected on a plane. If the entities are approximate with overlaps or gaps at the ends, those entities will be cycled through and the corners will be mended so that a complete chainable boundary is created. This is necessary so that UG creates a solid out of the curves. The output of the module is a solid flat pattern with no intelligence that can then be input to the bracket intelligence builder module.

Figure 20:
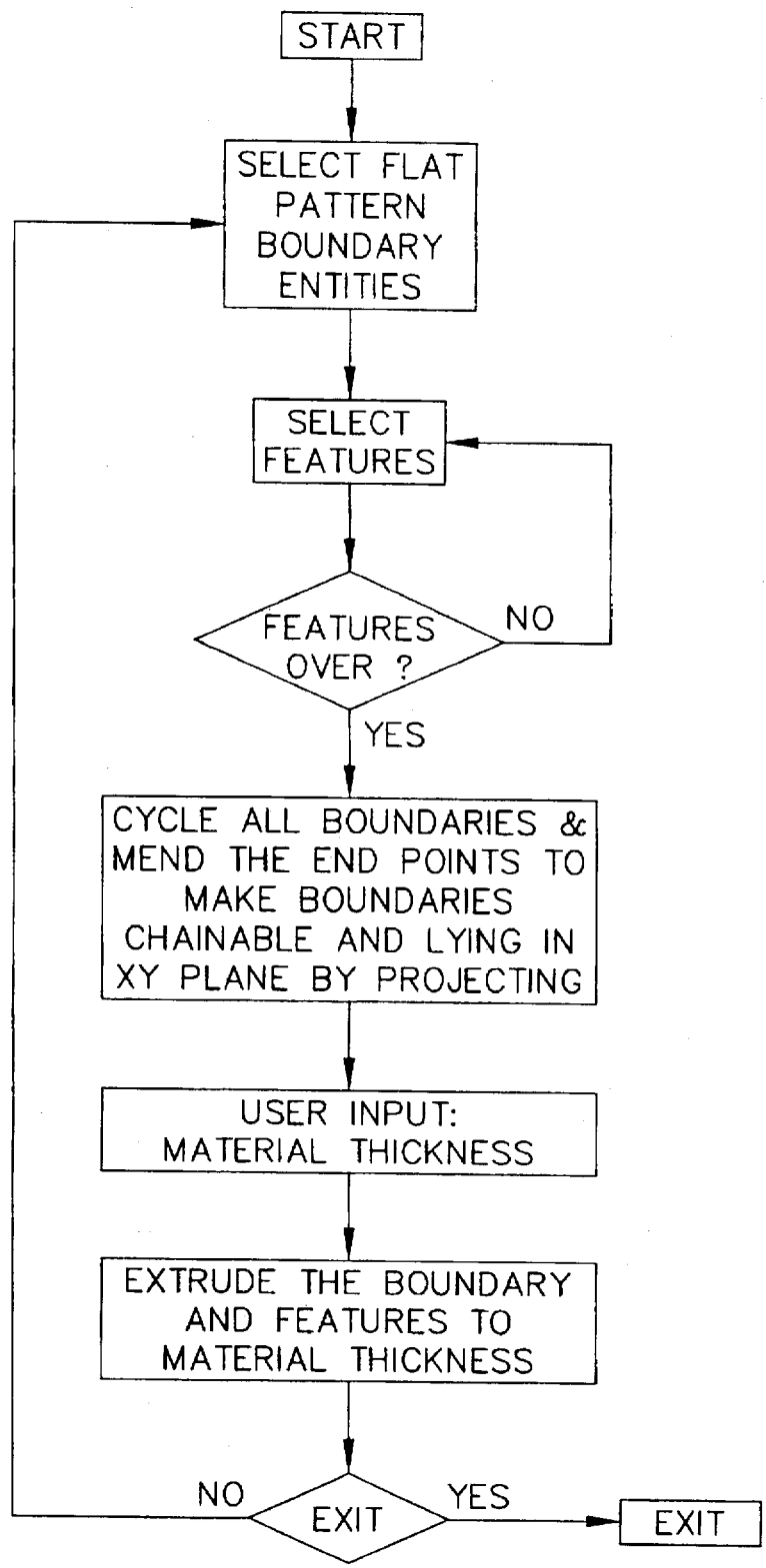
FIG. 20 illustrates process steps for the flat pattern wireframe preprocessor module.

FIG. 20 is a flow chart illustrating a sequence of process steps for the flat pattern wireframe preprocessor module. Processing starts by prompting the user to pick all the entities that will form a flat pattern outer boundary. The UG Entity selection menu with multi select capability and the mask set to curves only is provided and the user can pick all the entities that form the boundary of the flat pattern. The entities can be selected in any order.

The user is then prompted to pick the entities forming the various features such as holes and slots. The UG entity selection menu is available with the mask set to curves only and having the multi select capability. Once the user finishes specifying the features by selecting the "More Features→No" option, processing proceeds by cycling through the outer boundary and features of the flat pattern and mend them (if required) so that chainable boundaries are created that lie in one plane (XY). The user is then prompted for the thickness of the material, and the wireframe is extruded to generate a solid flat pattern along with all the features on the flanges including the bend reliefs, if available. Processing then returns to the previous menu when Exit is selected by the user.

Library Component Selection Module

Figure 21:
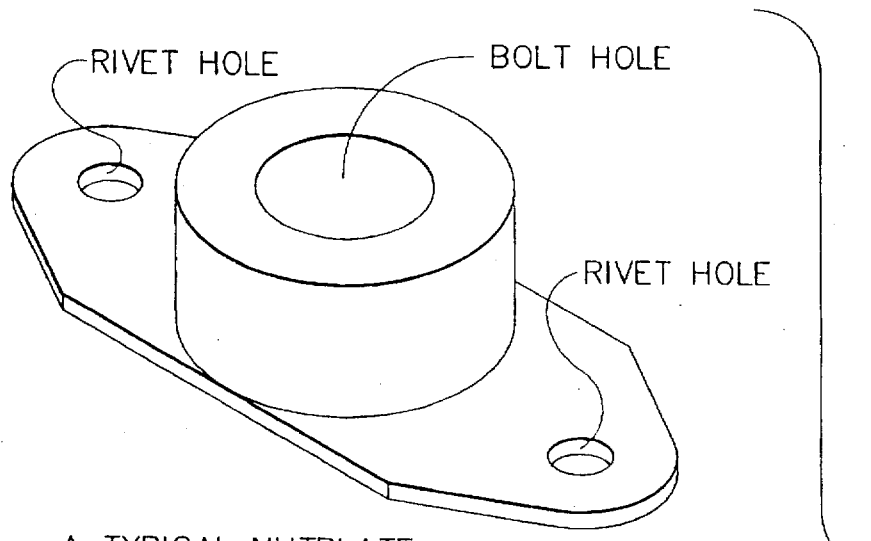
FIG. 21 illustrates a typical nutplate and selection variables and values.

The library component selection module aides the user in selecting and orienting components from the standard hardware library. The standard library consists of Nutplates, Clips (or other hardware as defined below) and Rivets. Nutplates and Clips are solid model part files with attributes for parts list generation. The rivet library is comprised of ASCII files. Rivets are represented in the bracket assembly model as a dashed line equal to the length of the rivet. The module allows the system manager to add new standard hardware types and selection criteria by editing the hardware type definition file as described below. The output of this module is a bracket assembly with standard hardware. FIG. 21 illustrates a typical nutplate and its associated selection variables and part attributes available from an ASCII file corresponding to the part file along with the object attributes in the part file.

Figure 22A:
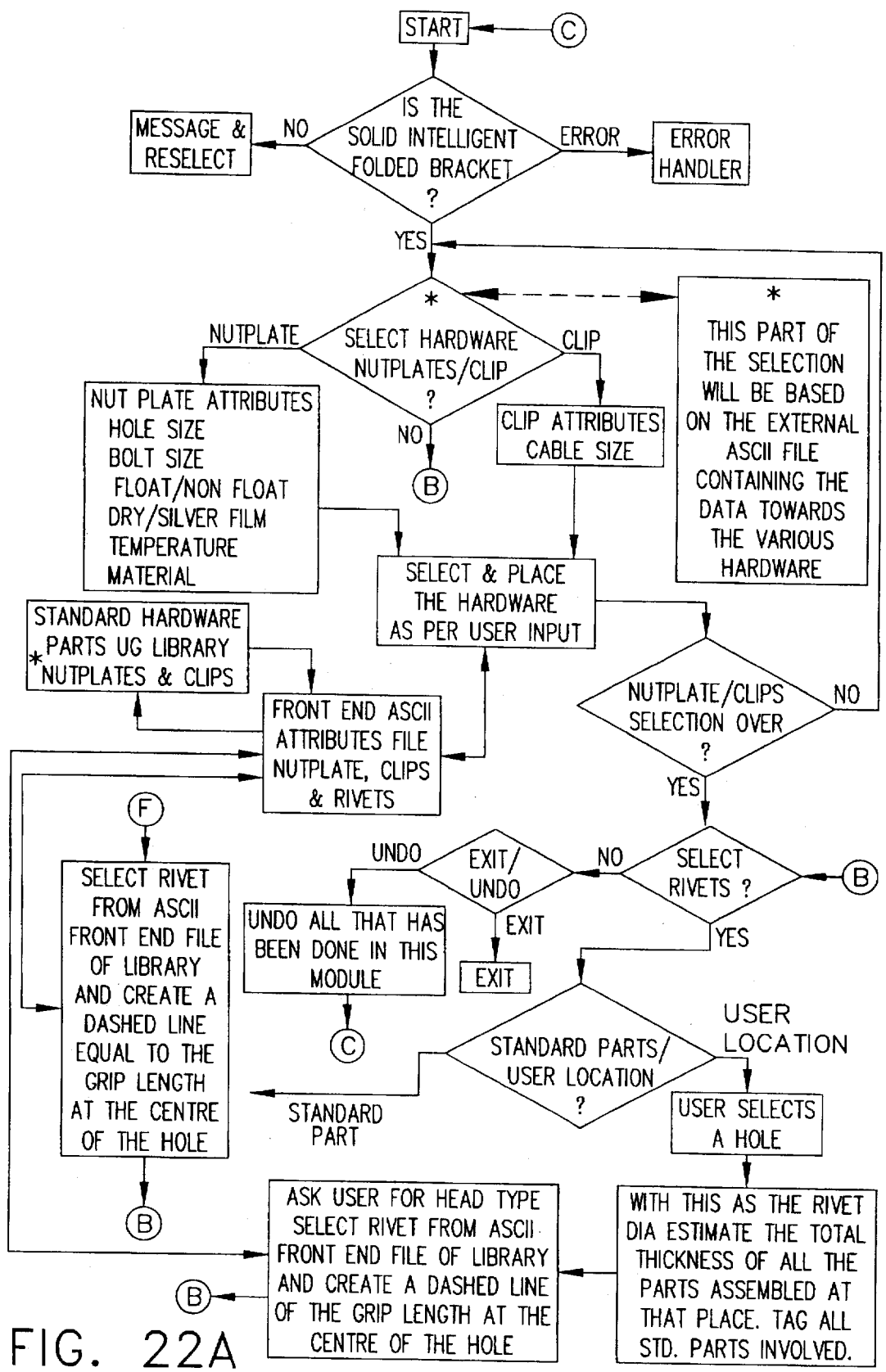
FIG. 22 illustrates process steps for the library component selection module.
Figure 22B:
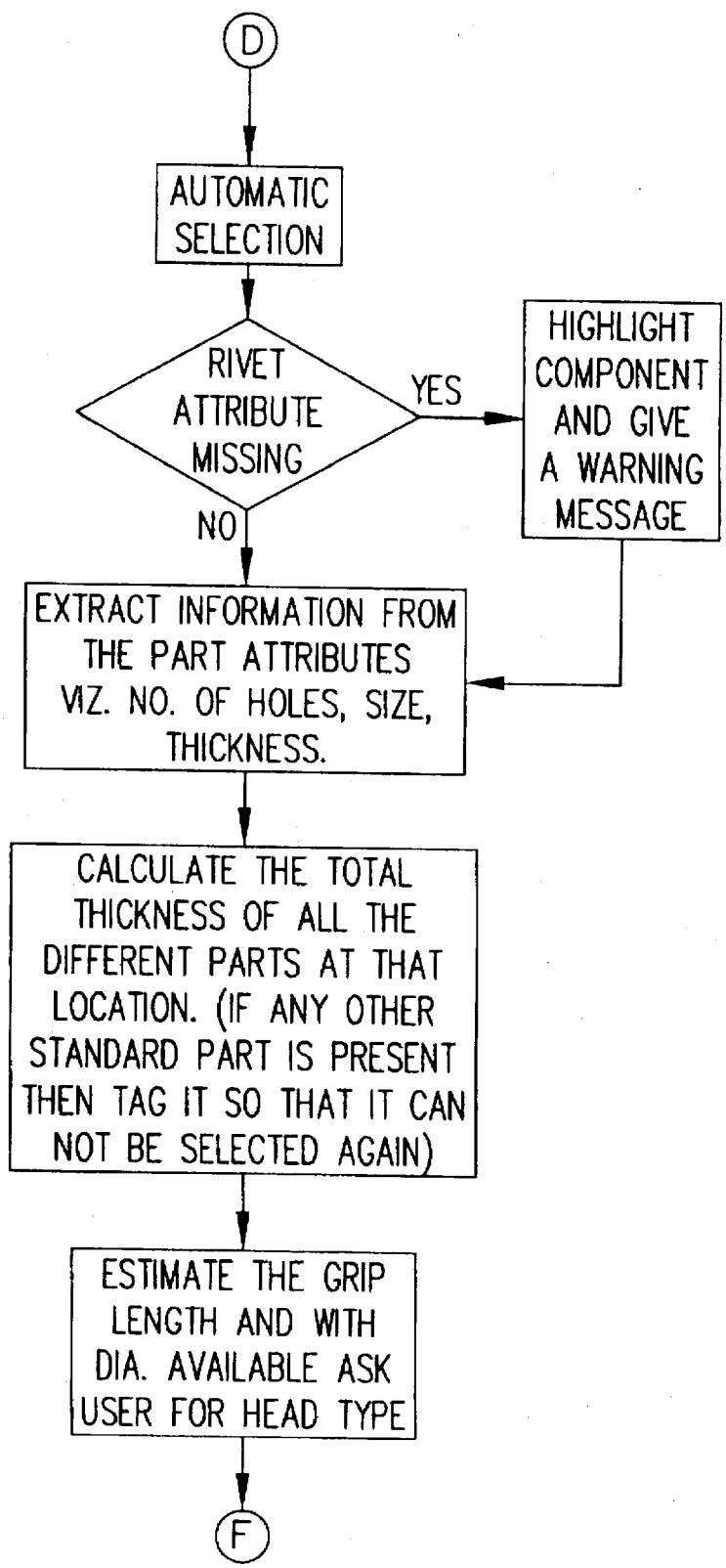

FIG. 22 illustrates a sequence of process steps for the library component selection module. Specifically, the hardware type definition file called "hardware_selection_params" is read and a motif selection menu is constructed. Rivets are the last option in the menu and are not defined in the type definition file. The hardware type definition file is located under the directory "library". The format of the file is as follows.

| | |
|---|---|
| 1) | Comment lines begin with a "#" and can be located anywhere in the file, blank lines and white space are ignored. Continued lines end with a "\". |
| 2) | The hardware type name, for example "nutplates" or "clips". |
| 3) | The keyword "begin". |
| 4) | Multiple lines of selection criteria as: name=value1, value2, ... Selection criteria which are fixed values generate motif options menus Example: float=float,nofloat or lube=dryfilm,silver |

```
            Selection criteria values of the form "*value"
            generate a motif text widget with a default of
            "value" in the text entry field.
            Selection criteria values of the form "*"
            generate a motif text widget with no default.
    5)      The keyword "end".
            Items 2-5 may be repeated as needed to define
            all the hardware types and associated selection
            criteria.
    A sample hardware type definition file follows:
    #hardware type definition file follows:
    This file defines the Nutplates and Clips hardware types
    nutplates
    begin
        bolt=.190-32, .250-28, .3125-24
        float=float, nofloat
        lube=dryfilm, silverplated
        program=*any
    end
    clips
    begin
        cabledia=.25-.30, .30-.35, .35-.40, .40-.50, .50-.60,
        .60-.70, \ .80-.90, .90-1.00, 1.00-.1.10, 1.10-1.20
        program=any, 80c2,f120
    end
```

The first menu presented contains the basic hardware types plus rivets as the last option. For the above example, the motif selection menu contains the following choices:

nutplates clips rivets

After selection of a hardware type, a menu of selection criteria is displayed. The user selects the desired selection criteria values either from an options menu or text entry as described above. Based on the selection criteria entered by the user, the standard hardware ASCII files are scanned and the part file names that match the selection criteria are displayed in a motif options menu. The user selects the desired part file from the menu. The part is "part merged/imported" into the assembly using the UG generic transformation function to aid the user in positioning the hardware at the desired location.

Since the rivet library is comprised of ASCII files and not part files, special logic is required. Rivet selection has two main options:

1. Standard Hardware Location

2. User Defined Location

If the user selects "Standard Hardware Location", then the system cycles the assembly and picks each standard component (nutplates and clips or hardware depending on the ASCII file mentioned above) and based on the rivet hole diameter available in the part attributes ("icds_rvdia") and the location (object attribute "icds_rivethole"), the user is prompted to toggle between the two head types, namely, "counter sunk" or "button head". The length of the rivet is then determined. All the solids assembled at that location are identified and the total thickness at that location determined. This thickness is the grip length of the rivet.

The length of the rivet is selected from the ASCII file ("rivets.length") in the directory "rivets") containing the data corresponding to different hole size versus rivet diameter to the grip length related to the rivet length. If the grip length required exceeds the values in the ASCII table, then the next longer rivet is selected. No duplication of rivets occurs by checking to ensure that the two standard library components do not share the same rivet. Based on the diameter, grip length and head type, the correct rivet is selected from the rivets ASCII file ("rivets.flush"—countersunk or "rivets.universal"—button head from the directory "rivets") and a dashed line representing the rivet is placed at the correct location. The length of the dashed line is equal to the length of the rivet. The attributes required for parts list generation is placed on each rivet line. This option works if the attribute "icds_rivethole" is present on hole edges.

The User Defined Location option prompts the user to select a hole edge (the UG entity selection mask is set to edges/arc only) and once selected, the rivet's length is determined based on the assembly at that location. If the edge selected by the user is not an arc, then an error message is displayed and the user is prompted to reselect. A rivet for that hole diameter and grip length plus head type is selected. The head type selection is made as a toggle between counter sunk and button head. A dashed line equal to the length of the rivet is placed in the part file. The attributes required for pans list generation are placed on each rivet line.

Selection of Exit returns program control to the previous menu.

Bracket Assembly Identification Mode

Figure 23:
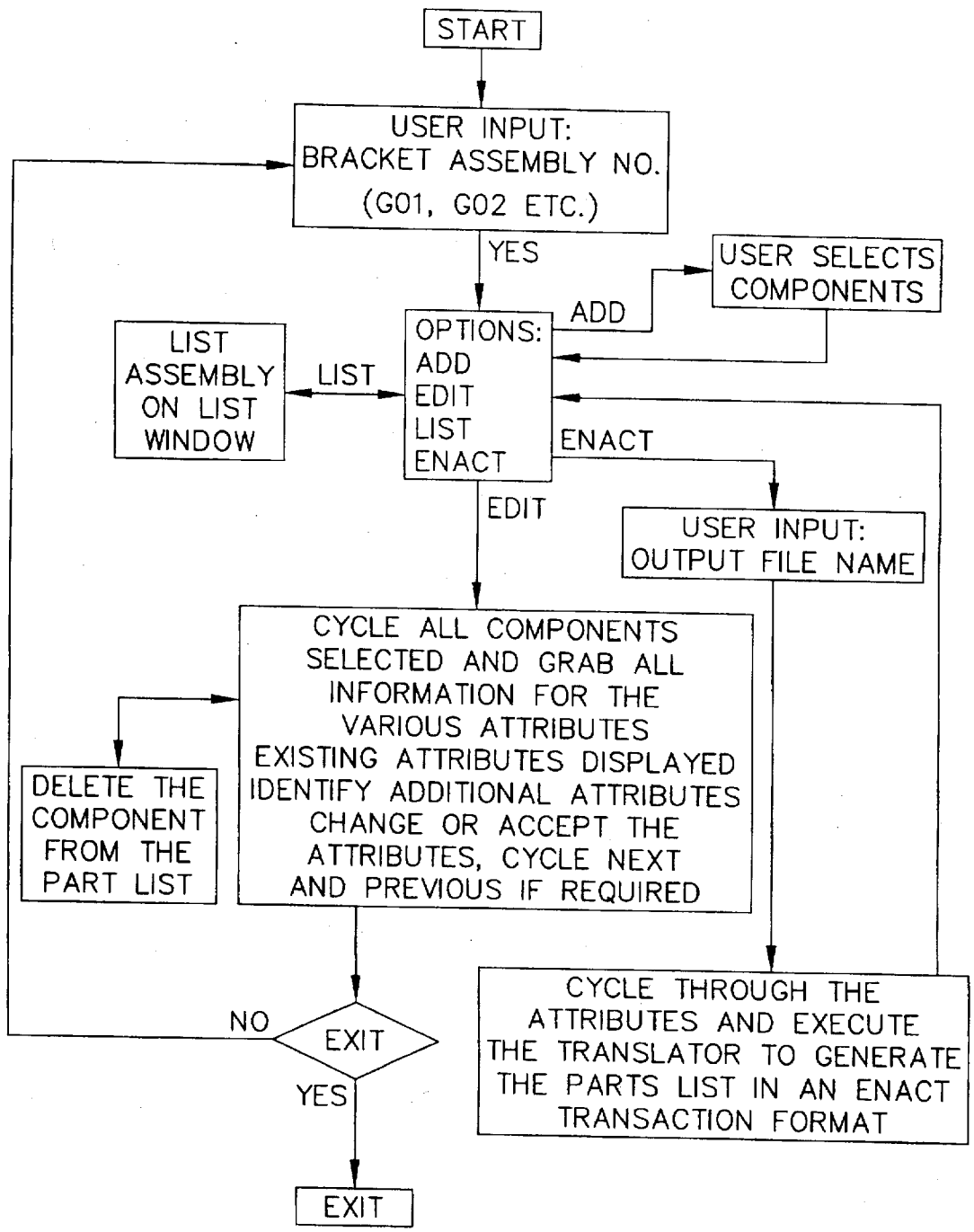
FIG. 23 illustrates process steps for the bracket assembly identification module.

The bracket assembly identification module identifies the relationship between the components (standard hardware library as well as user defined components) in the bracket part file in order to generate an ASCII parts list transaction file. This file may be used to update a bill of material (BOM) system. The UG parts list generation feature is used. The user can also list out the parts list in the UG BOM format. The output of the module is an assembly of a bracket with all the relationships built into it and a parts list, if FIG. 23 illustrates a sequence of process steps for the bracket assembly identification module. Specifically, the user is prompted to enter the Assembly Number (G01 or G02 for example) for the components. Multiple assemblies may exist within a part file. However, each assembly has a unique Assembly Number. The user also may rename an assembly.

This module has the following options: Add, Edit, List, Create parts list and Exit. In the "Add" mode, the user is provided with a multi component selection option to add as many components as desired to this assembly. The UG entity selection menu with the mask set to solids and curves only is provided. This allows the user to use standard entity selection techniques such as rectangles, individual digitizing and select all, for example. The user many not select the same component twice. When the user is done selecting components, the quantities of those components that have equal and non-blank icds_prtno attributes are combined and added. Addition of components can be added to a new or previously defined assembly.

In the "Edit" mode, the user cycles through the assembly components. The sequence of the components in this module is:

1) If any icds_itemid's are present, sequence on icds_itemid.

2) If no icds_itemid's are present, sequence on icds_nomen as follows:
    1. Assemblies (G01,G02,G03, ... )
    2. Nutplates
    3. Clips
    4. Spacers
    5. Rivets
    6. Flat Patterns (P001A, P003A, ... )
    7. Flat Patterns of Gussets and other pieces During this process, the current component is highlighted in the model. The user may change the component attribute values except for the icds_quantity value tallied by the system. These values may have been entered by the user earlier, or obtained from the library of standard parts. The attributes that are identified by this module are:

| | | |
|---|---|---|
| 1. | icds_prtno | (Part number of the component) |
| 2. | icds_nomen | (Nomenclature of the component) |
| 3. | icds_attach | (Attach criteria for the component, one of Rivet/Weld/Braze/None) This is a motif "options menu". |
| 4. | icds_drawing_zone | (The valid zone numbers are an alpha followed by an integer which could be maximum 2 digits long) |
| 5. | icds_quantity | (Cannot be modified by the user) |
| 6. | icds_itemid | (Item Id of the component) |

The user can accept the values shown or change them. Selecting "Next" makes the next component current if one exists. Otherwise, a message indicating "no more components exist" is displayed. Selecting "Previous" behaves in a similar manner except in reverse order. Selecting "Delete" removes the current component from the assembly. When the user exits the Edit mode, processing resequences the components as specified above.

In the "List" mode, the current assembly is listed in a scrolling window.

In the "Create Parts List" mode, an ASCII parts list is created based on the assembly relationship and the attributes available. The list is in the format of a transaction parts list file. If any attributes are missing, other than icds_drawing_zone which is optional, an error message is displayed and no action is taken. The user is prompted to input a file name that contains the output of the module—the transaction parts list file. The system provides a default file name of partname_gOx.enact where gOx is the current assembly number.

Selection of "Exit" returns processing to the previous menu. However, if no components exist for the current Assembly Number, any references to that number are removed.

Drawing Format And Title Block Annotation Module

The drawing format and title block annotation module allows the user enter global part/drawing information and automatically select, place and annotate drawing formats based on the captured information. Multiple drawing sheets are supported. Required information is provided by the user in a motif dialog window. The output of this module is a fully annotated drawing format.

Figure 24:
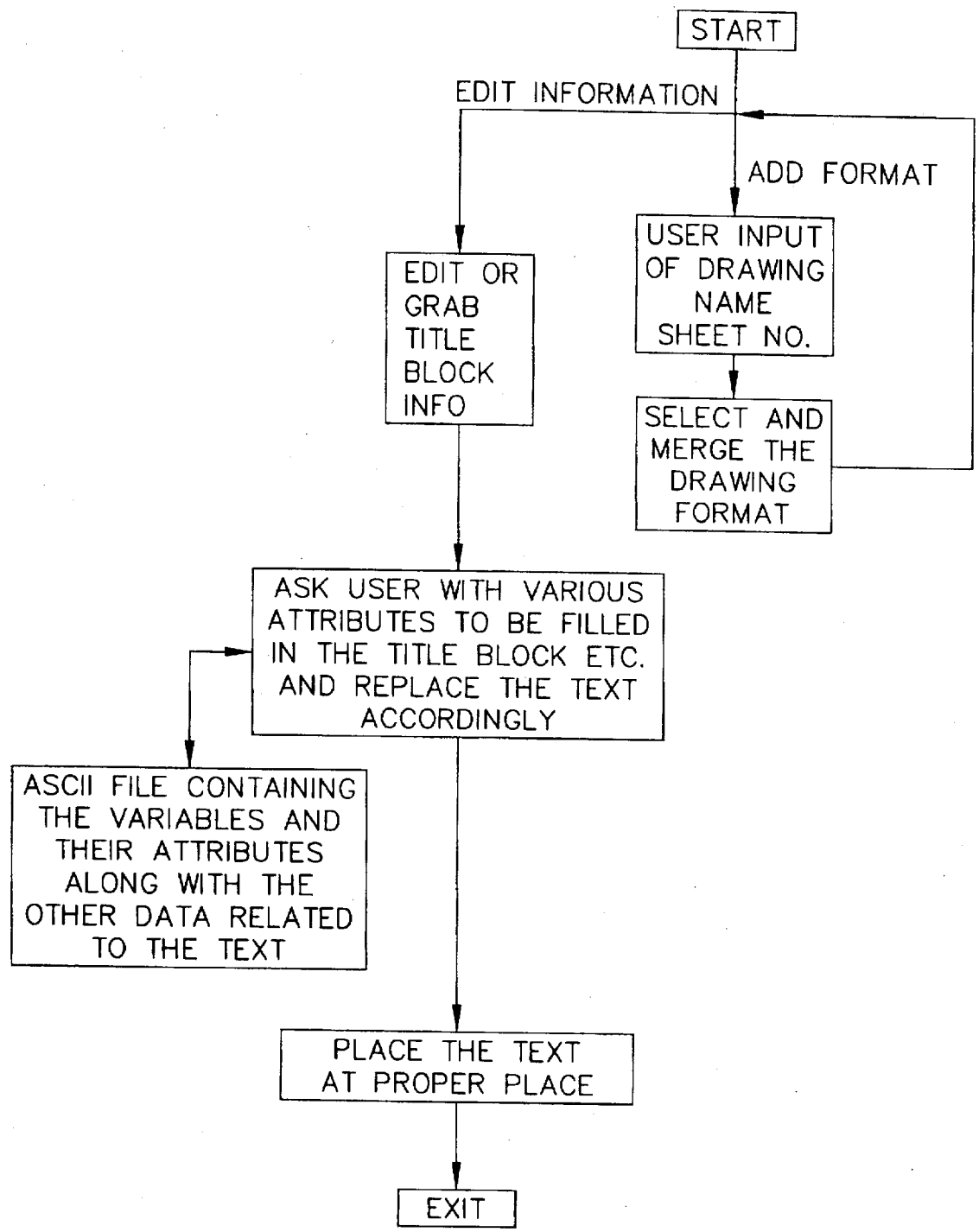
FIG. 24 illustrates process steps for the drawing format and title block annotation module.

A flow chart illustrating a sequence of process steps for the drawing format and title block annotation module is shown in FIG. 24. The module has the following options: Edit Information, Add format and Exit. In the Edit Information mode, the system gathers the global information from the user. The following are examples of global data that is captured from the user:

Drawing Title
Contract# DR#
SIN (significant item number)
ENG family
Drawing Number
Similar to (similar to which part; i.e., when modified from an earlier part)
Station (Location w.r.t. engine)
Distribution Code (distribution list)
File Location (the place where the file is stored)
Signature Names
Interface Block (signatures of internal groups)
Customer Interface (signatures of external groups)
Layout In the Edit Information mode, a motif dialog box is displayed which prompts the user to enter the data. The prompts and data entry fields of the motif dialog box are constructed at run time based on the contents of a menu definition file called "drawing_annotation_menu.dat" available in the directory "dwg_formats". The data entry fields are filled with values of part attributes from previous runs of this function. The menu has the typical "ok", "apply" and "cancel" buttons at the bottom. When the user selects ok or apply, the part attributes specified in the menu definition file are created or updated with the values captured from the user and all drawing formats, if present, are annotated as described in connection with the Add Format mode. Selecting OK brings the user back to the previous menu while selecting apply leaves the dialog box in place for further user data entry. By selecting Cancel, processing exits back to the previous menu without creating or updating any attribute data.

In the Add Format mode, a motif dialog box is displayed which prompts the user to enter: 1) the UG drawing name and 2) the desired sheet number. The sheet number defaults to the next available sheet number. For example, if no formats are present in the part, then the sheet number would be "1". If two formats are present in the part, then the sheet number would be "3".

Next, the part attribute "icds_drawing_size" is read to get the drawing size, and then the corresponding UG format part from the dwg_formats directory is merged. The format part files contain text entities in the correct locations on the format. These text entities are initially be set to the "#" character. Each of these text entities has an entity attribute which matches the corresponding part attribute created in the Edit Information mode.

Processing cycles the database for all text entities which have these attributes and edits the text to match the value in the part attribute. Each format and its text is grouped.

Item Balloon/Label Generation And Placement Module

The item balloon/label generation and placement module allows the user to automatically place item number balloons or labels on the drawing to identify each component. The text consists of the item identifier or part number. If the user selects the item identifier, then the identifier is placed in a balloon. If the selection is for a part number, then the part number is placed as a label. In addition, this module also provides the user with a facility to label the flat pattern with its associated values of bends, bend radius, material, the part number and stock thickness. The output of this module is a detail drawing (views and other dimensions having been created by the user through interactive UG) having item number identifier balloons or part number labels and bend identification labels on the flat pattern.

Figure 25:
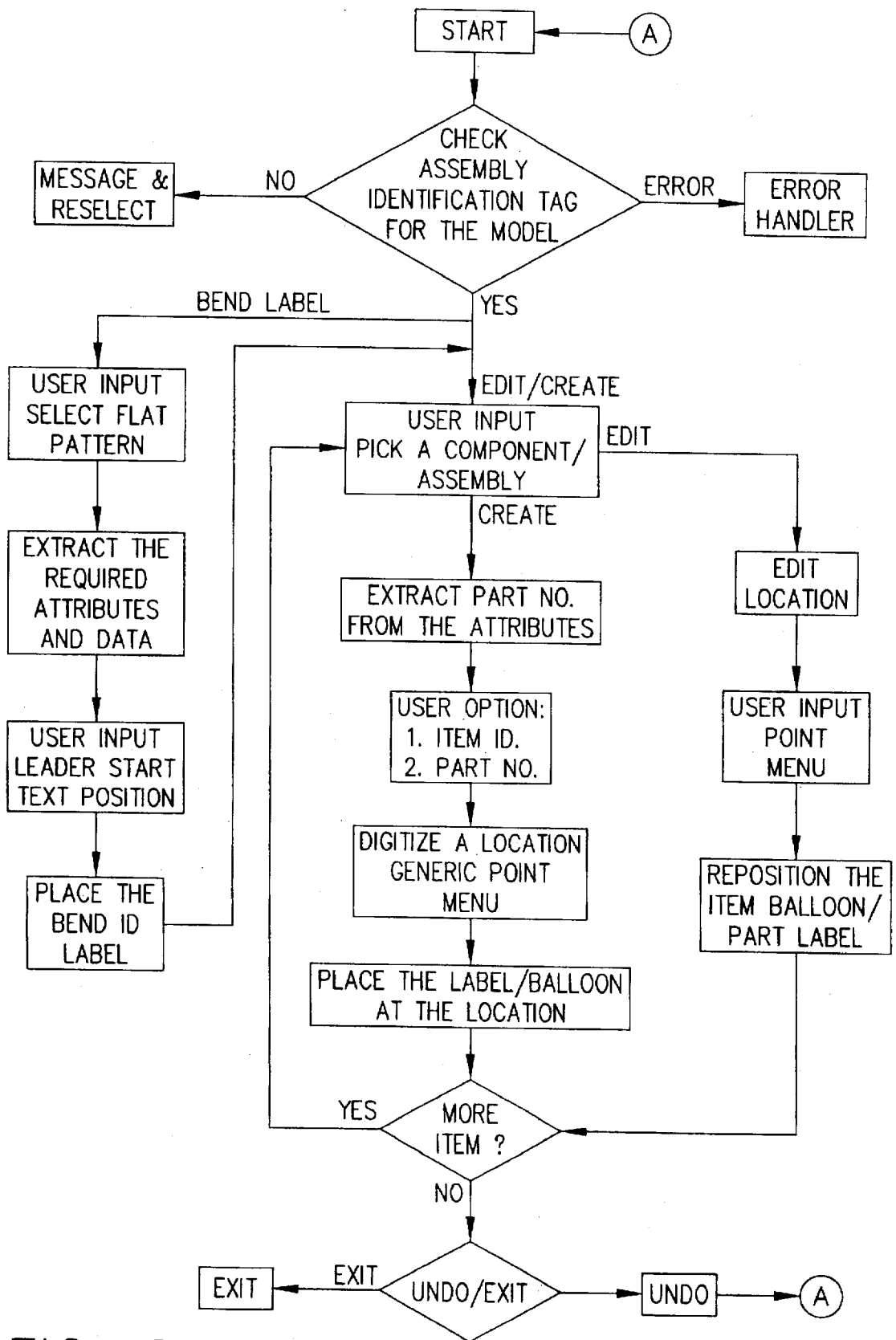
FIG. 25 illustrates process steps for the item balloon/label generation and placement module.

FIG. 25 is a flow chart illustrating a sequence of process steps for the item balloon/label generation and placement module. Specifically, the module has five modes, namely, Create, Edit, Bend Label, Undo and Exit. If the user picks the Create mode, then the user first has to select whether Item Identifier or the Part Number is to be created. The user is then prompted to pick a component for identification label/balloon. Once a valid body is selected (the UG entity selection menu with the mask set to Solid and Curve is provided), the required attribute is obtained from its database and the user is prompted with the UG Point Generic Menu to place the Item Identifier (Balloon) or Part Number (Label). The balloon size is ½" dia if there are up to two characters and ⅝" dia if there are more than two characters.

If the user selects the edit mode, then the user is prompted for a component selection by a UG. entity selection menu with the mask set to Solid and Curve. The user can then either select placement for editing and/or change the item identifier to part number. For placement, the UG Point Generic Menu is displayed. Selecting Toggle causes the Item Identifier and Part Number to change one from the other, whichever is existing.

If the user selects the Bend Label mode, then the system prompts the user to select the flat pattern from the drawing. The UG entity selection menu with the mask set to solid is available. The attributes and other related data of that flat pattern are cycled through and the part number, material, stock thickness, bend radius and the corresponding bend angles are selected. If the flat pattern does not have the part number as its attribute, then this information is taken from the folded solid that is synchronized with the flat pattern. Each bend angle is shown within a range of two degrees, which would be one degree less than the nominal and one degree above the nominal. All bends having the same radius are located as separate groups following the bend radius enclosed in a box. The user is then prompted for the leader originating point followed by the text placement point. In both the cases, the UG point genetic menu is available.

Selecting Undo causes all the item balloons and labels created in the session to be discarded and brings the drawing to a state it was prior to entering the module.

Bracket Notes Selection And Placement Module

The bracket notes selection and placement module determines which note package to use for a bracket based on the information in the bracket assembly. Once a note packet is identified, then that note package is constructed from ASCII files and placed on the drawing.

The input is as follows.

1. A bracket part file containing a drawing. Some of the information needed to select the note package is entered in the bracket assembly identification module. Therefore, the user should have executed that module previously.
2. An ASCII file indicating what note package to use based on the bracket assembly. This file is named "selection_matrix".
3. An ASCII file of single notes that make up the note packages. This file is named "single_notes".
4. An ASCII file of notes package definitions, i.e., individual notes that make up each package. This file is named "package_def".

The output of this module is the drawing with the proper note package.

Figure 26:
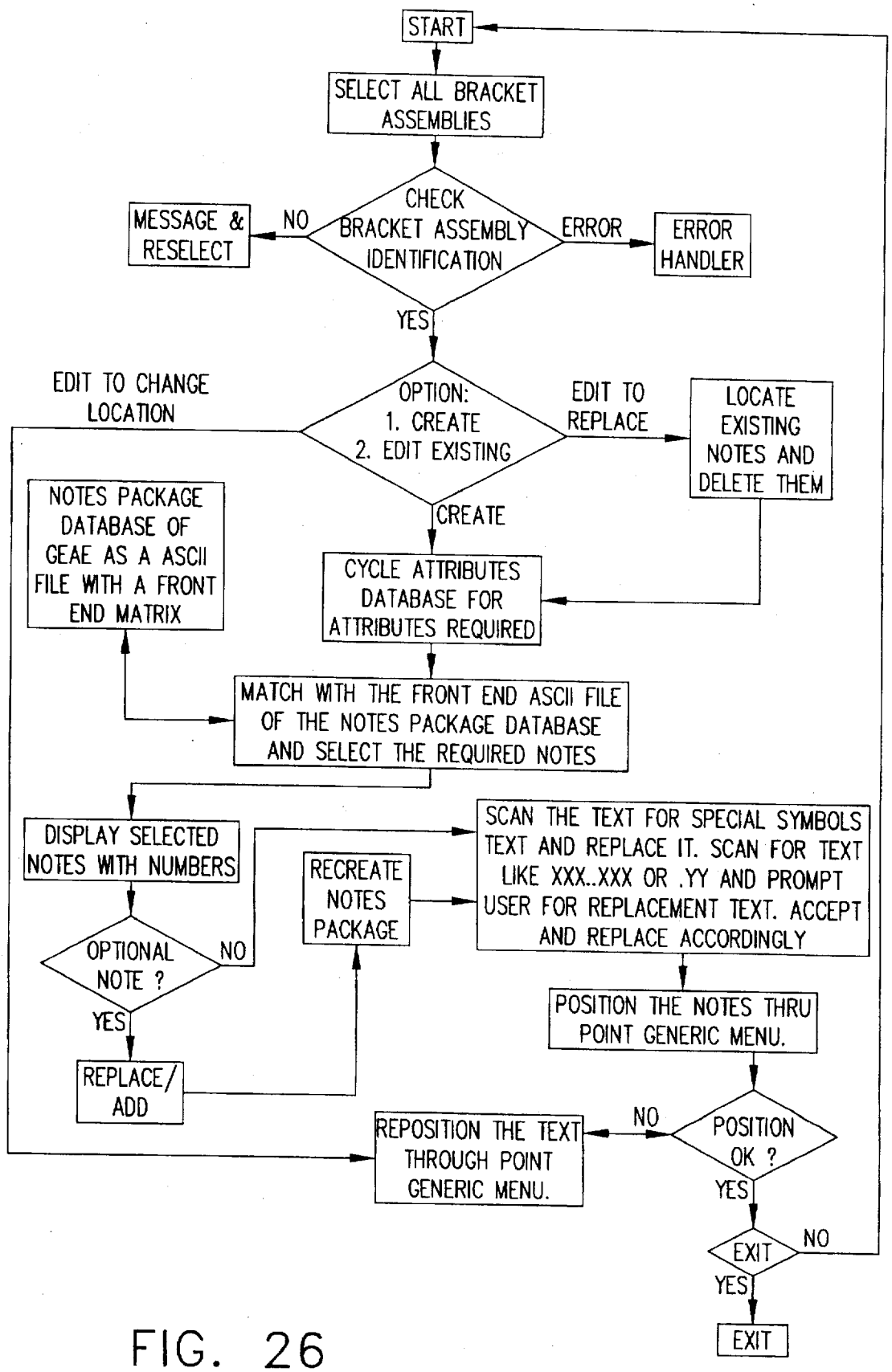
FIG. 26 illustrates process steps for the notes selection and placement module.

FIG. 26 is a flow chart illustrating a sequence of process steps for the notes selection and placement module. Particularly, the module has three options on its dialogue box, namely, Create, Edit and Exit. Selecting Create enables creation of a new notes package based on the attributes data available in the assemblies. Selecting Edit enables the user to recreate the notes package, add or replace optional notes and reposition the notes oft the drawing. Selecting Exit returns processing to the previous menu.

If the user selects Create, the assembly components that have been identified through the bracket assembly identification module are examined to determine the values of the following parameters:

| | |
|---|---|
| Material | As determined in the bracket intelligence builder module |

The following information is available from the bracket assembly identification module.

| | | |
|---|---|---|
| Bracket | Unknown/Assembly/part | Whether this is an assembly or a single part bracket |
| Welded | No/Yes | Whether there is welding. |
| Brazed | No/Yes | whether there is brazing. |
| Riveted | No/Yes | Whether there are rivets. |
| Floating Nutplate | No/Yes | Whether there are floating nutplates. If nutplates were obtained from the library, they have an attribute indicating whether they are of the float or fixed type. |
| Fixed Nutplate | No/Yes | Whether there are fixed floating nutplates. If nutplates were obtained from the library, they have an attribute indicating whether they are of the float or fixed type. |
| Spacers | No/Yes | The program will test the icds_nomen, attribute of all the parts identified in the bracket assembty identification module for the value "SPACER" in the first 6 characters. Either upper or lower case in any character will be considered a match. |

If a parameter cannot be determined, the parameter is set to the first value shown above, for example, Welded=No.

A selection menu with each of these parameters set to the values determined above is then displayed, along with a motif toggle "radio button" to allow the user to override those values. For example, the parameters may be set as follows:

| | |
|---|---|
| Material | AMS510 |
| Bracket | Assembly |
| Welded | Yes |
| Brazed | No |
| Riveted | Yes |
| Floating Nutplate | No |
| Fixed Nutplate | Yes |
| Spacers | Yes |

The user, however, might realize that brazing is required although it was not detected. Therefore, the user may toggle that parameter to Yes.

When the user is satisfied with the parameters and selects the OK button, the system uses the parameters and the "selection_matrix" ASCII file to determine the note package needed and constructs that note package. To create the package, the system reads the "package_def" file and builds each package using the note identifiers.

For example, for the First entry in the "package_def" file which is b1001b,100001,100002, the individual notes that make up the package from the "single_notes" file between the BEGIN and END lines of the 100001 and 100002 entries are obtained. If the users selection does not match any of the criteria available in the selection matrix, an error message will be given and no notes are created.

The selected notes are numbered in increasing order from bottom to top and displayed in a separate window. The user is given the option to use any of the optional notes from the optional notes package. If the user selects Yes, then another window is displayed showing the optional notes. The optional notes are scrollable motif windows. The user then selects the optional notes by selecting the optional notes number as displayed in the window. The user can either Add optional notes to the notes package or Replace an individual note. Depending on the selection, appropriate action is taken and the notes package is renumbered.

The system also determines the total height of the text generated and compares it with the available height on the drawing sheet. The height available on the drawing sheet is the vertical distance between the top line of the title block and the bottom line of the top of the drawing sheet minus notes_top_space and notes_bottom-space. The two defaults will be picked from the defaults_file. If the height available on the drawing sheet is less than the height of the notes package, then the program splits the notes package in two columns with the new column coming on the left of the existing text. The notes are split so that each column starts and ends with a complete note. The notes generated are placed on the sheet at a distance of notes_bottom_space above the title block and notes_right_space from the innermost right line of the drawing format. If the user wants, the text can be repositioned using the UG Generic Point Menu or except the default.

A part attribute "icds_note_pkg" with the value of the note package also is created or updated. This allows the drawing format and title block annotation module to annotate the drawing format with the notes package identifier number.

If the user selects Edit, the existing note package, reposition of the existing note package can be replaced or the optional note logic described above can be executed.

The following replacement logic is available both in the create and edit mode. Particularly, if the notes contain the following embedded variable fields: "XXX", ".XXX", ".YY", then the user is prompted for replacement values. The three variables have the following valid inputs.

a. "XXX" Positive Integer Only (Maximum 3 digits)
 b. ".XXX" Any alphanumeric character string but maximum three characters long
 c. Either of 0.02 or 0.03

The notes may also contain an "*" followed by an alpha character which automatically replaces the value with a symbol.

Weld Gap Healing Module

The weld gap healing module allows the user to stretch and trim the faces representing weld gaps already identified by the user in the weld gaps check module and unite them such that a sharp corner will exist without the weld gap. In case these gaps were not previously identified, or if the user wants to heal the gaps existing between a bracket flange and a user defined gusset flange, the user may identify the two faces and then heal the gap.

All the bracket intelligence data other than the material type and stock thickness is lost once this module is executed. The output is a weld gaps healed solid that can be used for further analysis but is be re-usable again without proper modifications.

Figure 27:
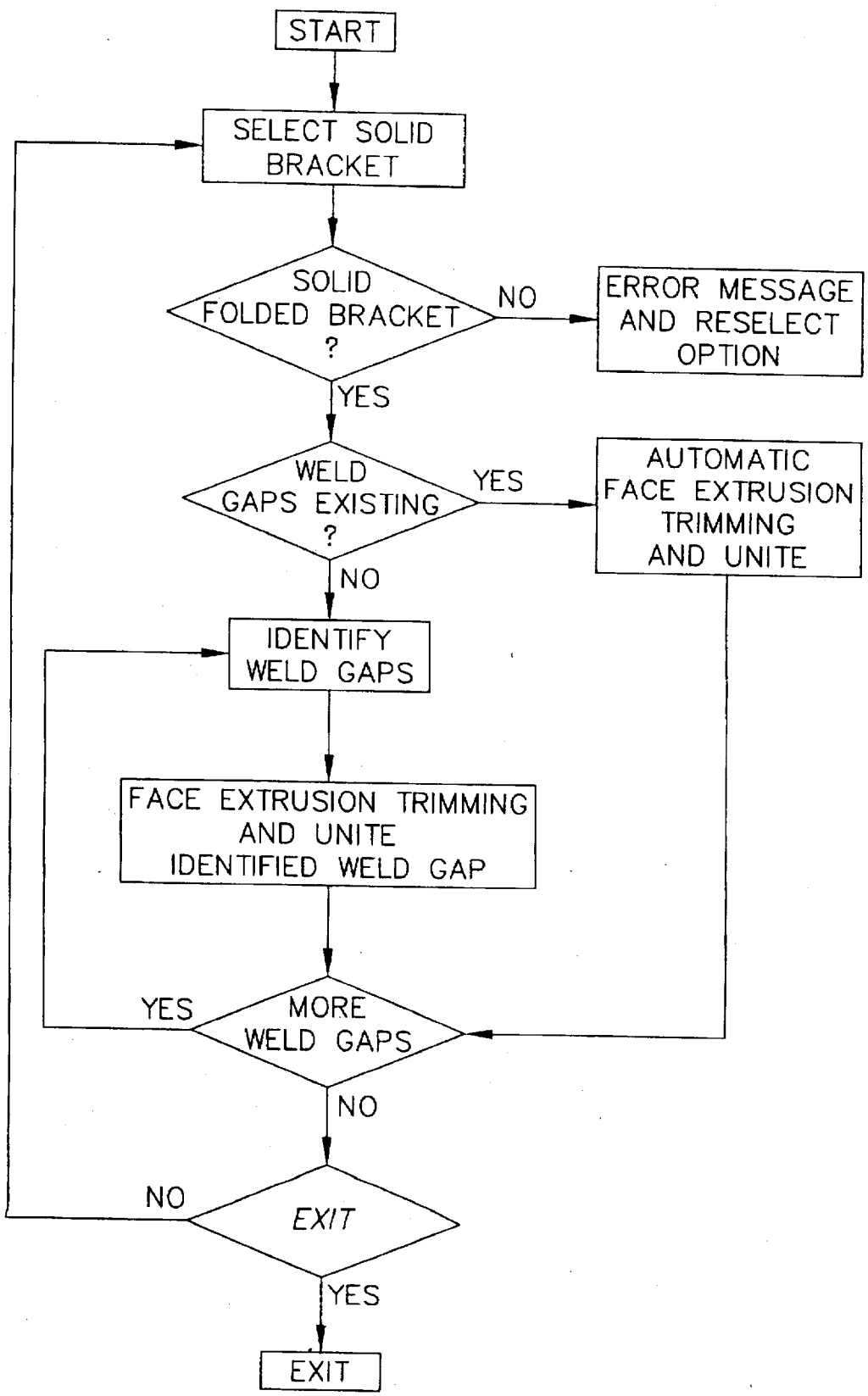
FIG. 27 illustrates process steps for the weld gap healing module.
Figure 28A:
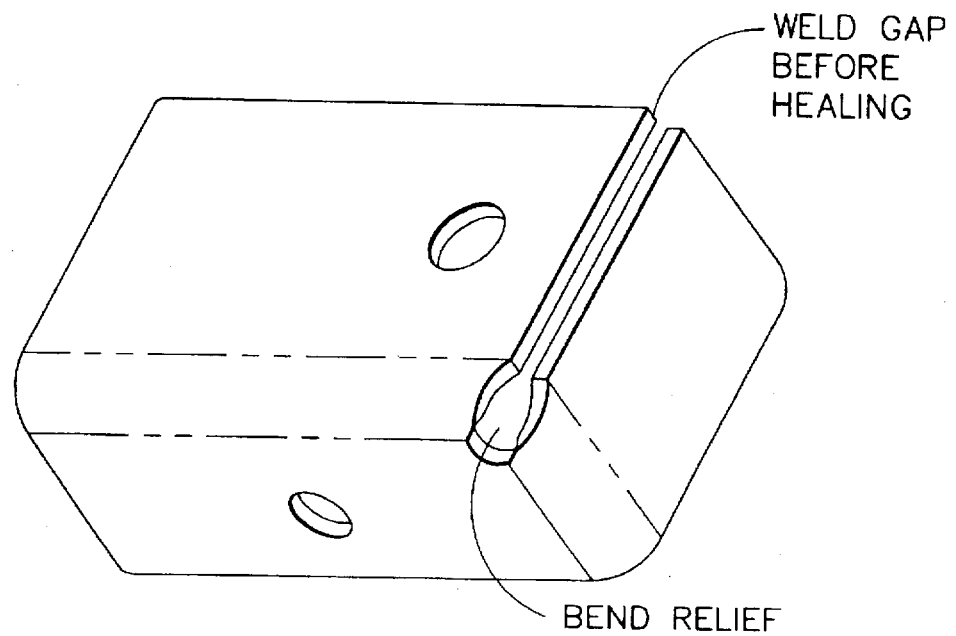
FIGS. 28A and 28B illustrate a weld gap before healing and a weld gap after healing, respectively.
Figure 28B:
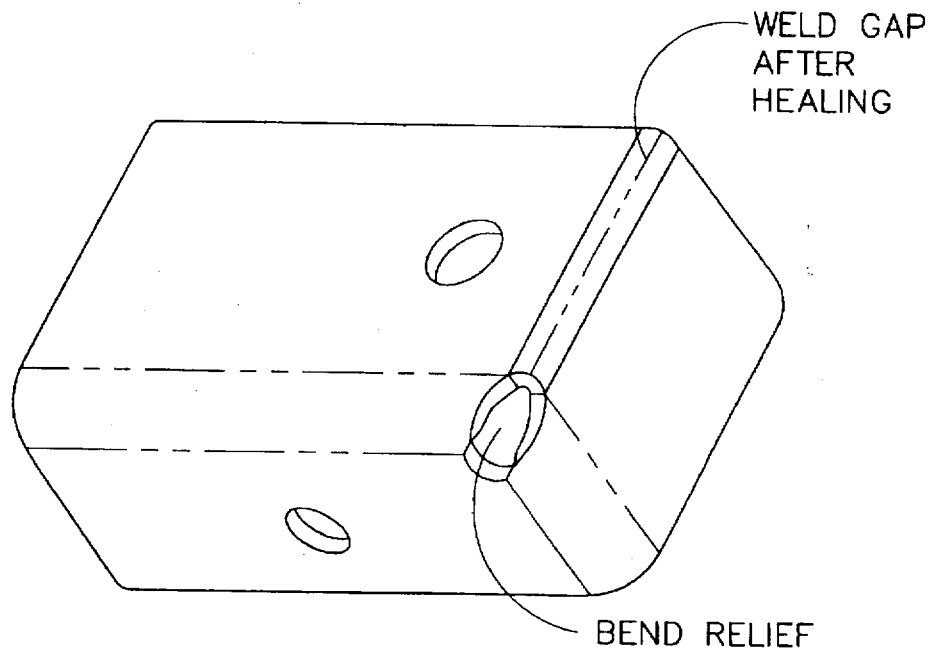

FIG. 27 illustrates a sequence of process steps for the weld gap healing module. Specifically, the user is prompted for the selection of the solid folded bracket. The UG entity selection menu is provided with the entity selection mask set to solids only. The solid is checked to determine whether it has any weld gaps identified. If any weld gaps are identified, the faces involved in the weld gaps are stretched and the healed solid is created. Then, or if no weld gaps are found, the user is prompted to select the two faces forming a weld gap pair by pair and the gaps will be healed by stretching and other trimmings. At this stage, the two faces need not belong to the same solid but the user must be sure that those are the two faces that need to be healed. A weld gap before healing is illustrated in FIG. 28A and a weld gap after healing is illustrated in FIG. 28B.

The user can stop the weld gaps selection loop by selecting No at the prompt asking to select more weld gaps. Selecting Exit causes processing to return to the previous menu.

Notes Package Report Writer

The notes package report writer is a separate program executable by the use of UFUNC that generates the notes packages in a report form. The input is three ASCII files. The files are the:

Individual notes that make up a note packages ("single_notes"),

Headings for each note package ("headings"), and

Notes package definitions ("package_def").

The output is a postscript format file.

The notes package report writer program is a separate UFUNC program that prompts the user for an output file name. Then, using the above referenced files, a report is created. To create the report, the "package_def" file is read, the headings from the "headings" file are retrieved, and each package is built using the note identifiers.

For example, for the first entry in the "package_def" file which is b1001b,100001,100002, the headings from the "headings" file between the BEGIN and END lines following the b1001b identifier are obtained, and the individual notes that make up the package from the "single_notes" between the BEGIN and END lines of the 100001 and 100002 entries are obtained.

The report is created as a UG part file containing as many drawing sheets as there are number of pages. The UG file is transferred to a post script format and written to the output file for subsequent printing.

Each notes package begins on a separate page with its corresponding heading. If a package contains more than 58 lines, then a new page is started, including repeating the heading. Each optional note does not have to begin on a separate page (except for the first one), but when a page break is needed, do not break in the middle of an optional note. All the special characters (the ones following '*') are converted to the UG symbol. All the other special characters, XXX, .XXX and .YY are not be changed. The notes are numbered in ascending order from the bottom.

Menus

Figure 29:
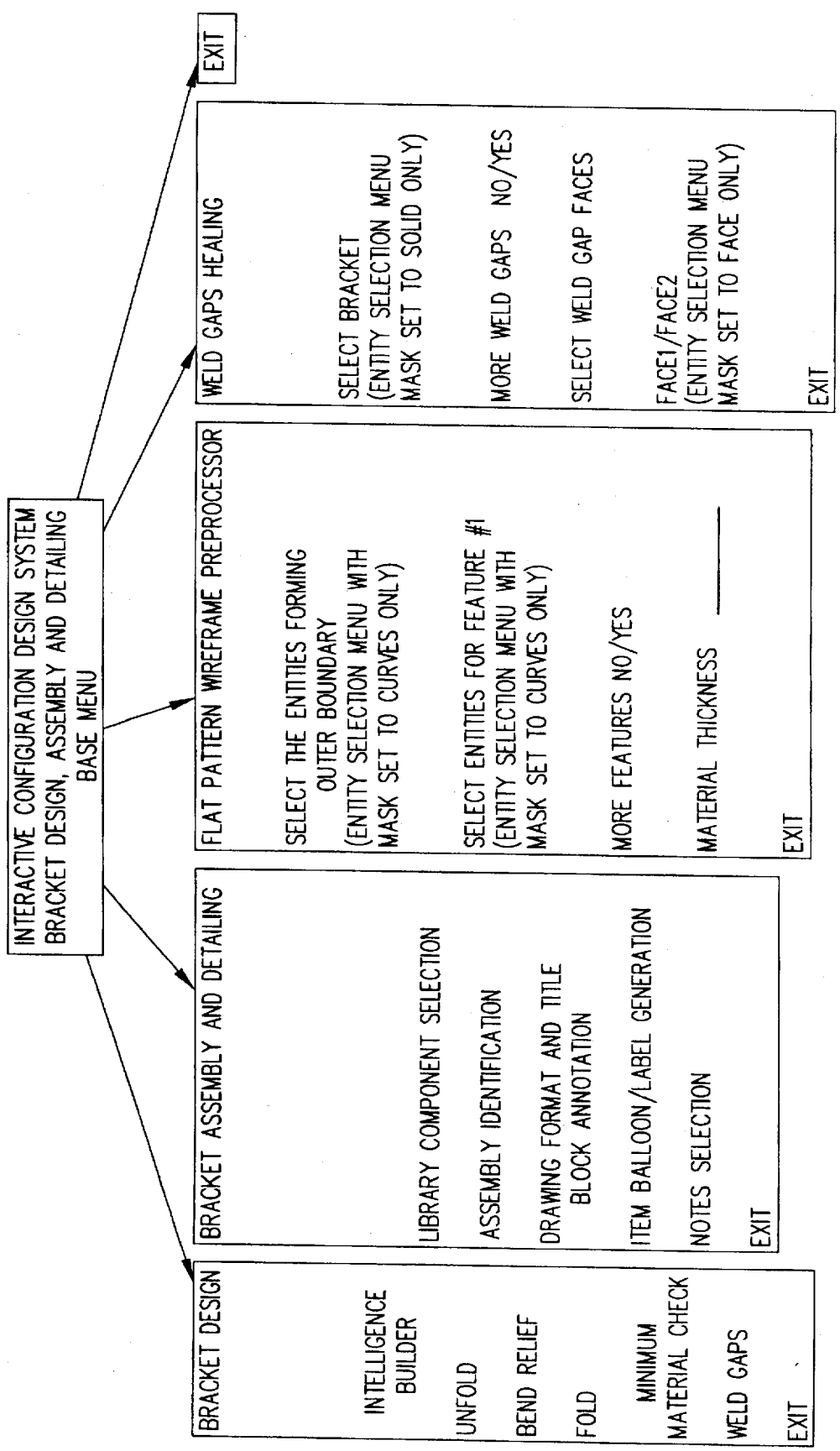
FIG. 29 illustrates the base menu structure.
Figure 30A:
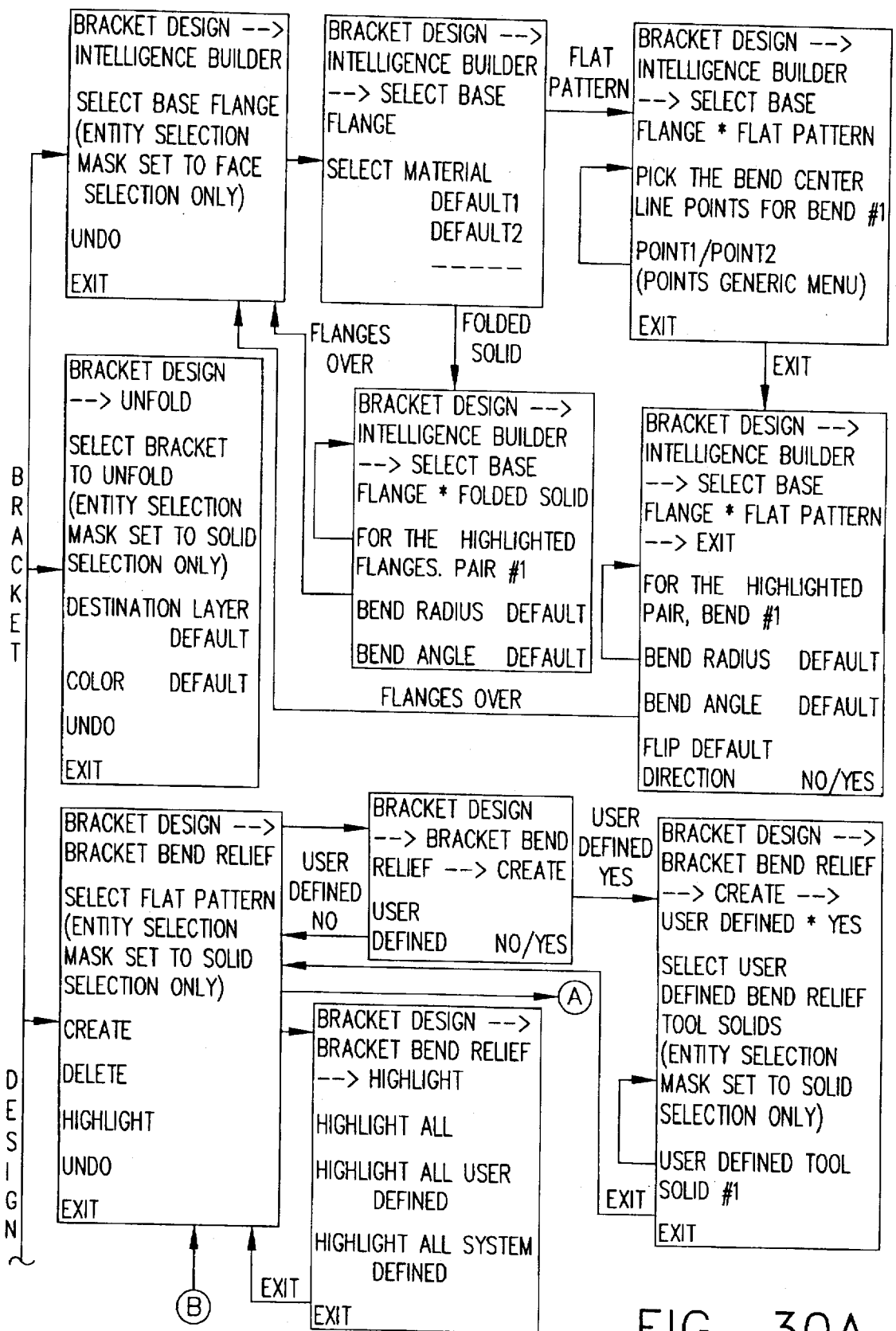
FIG. 30 illustrates the bracket design menu structure.
Figure 30B:
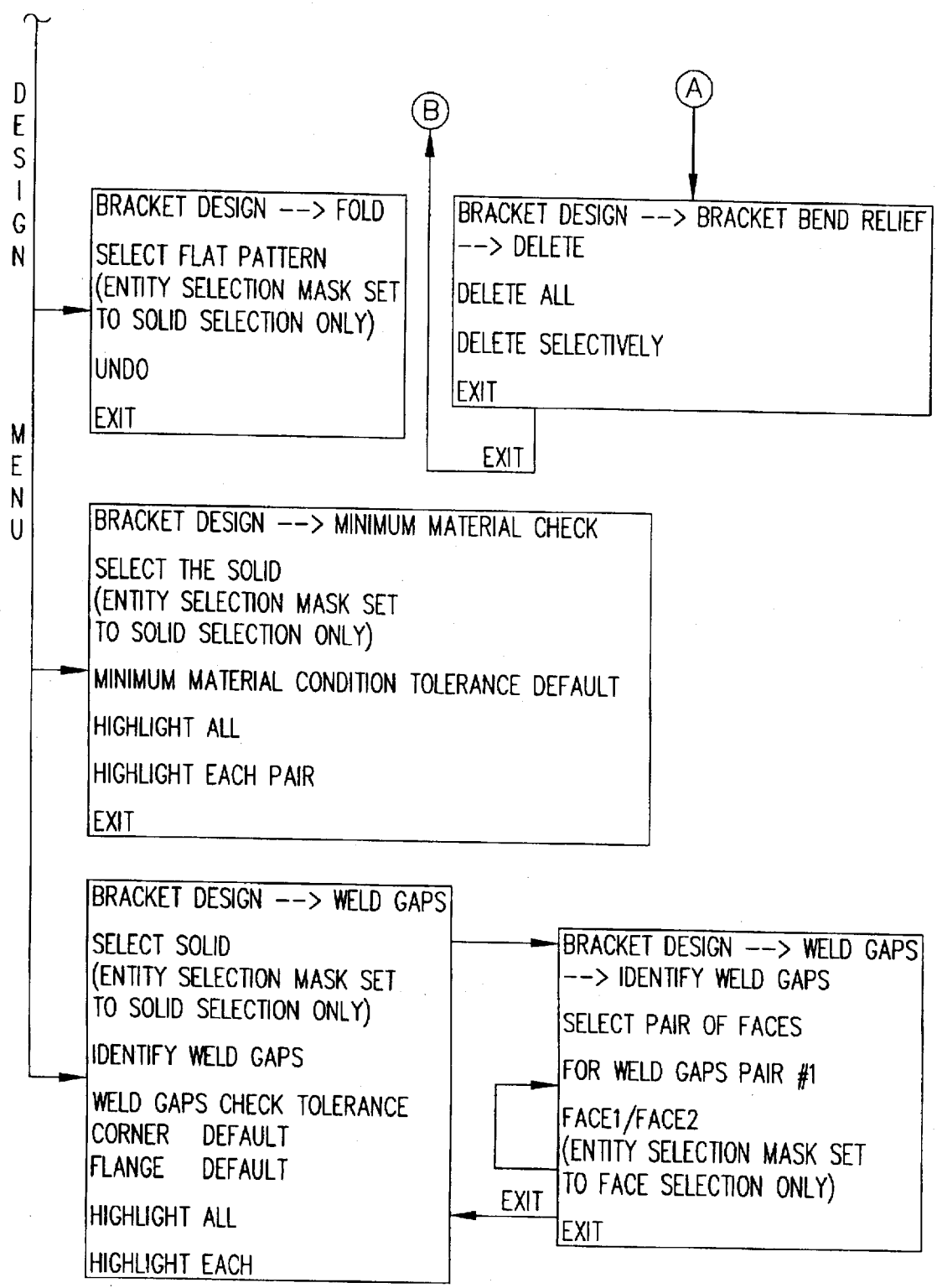
Figure 31A:
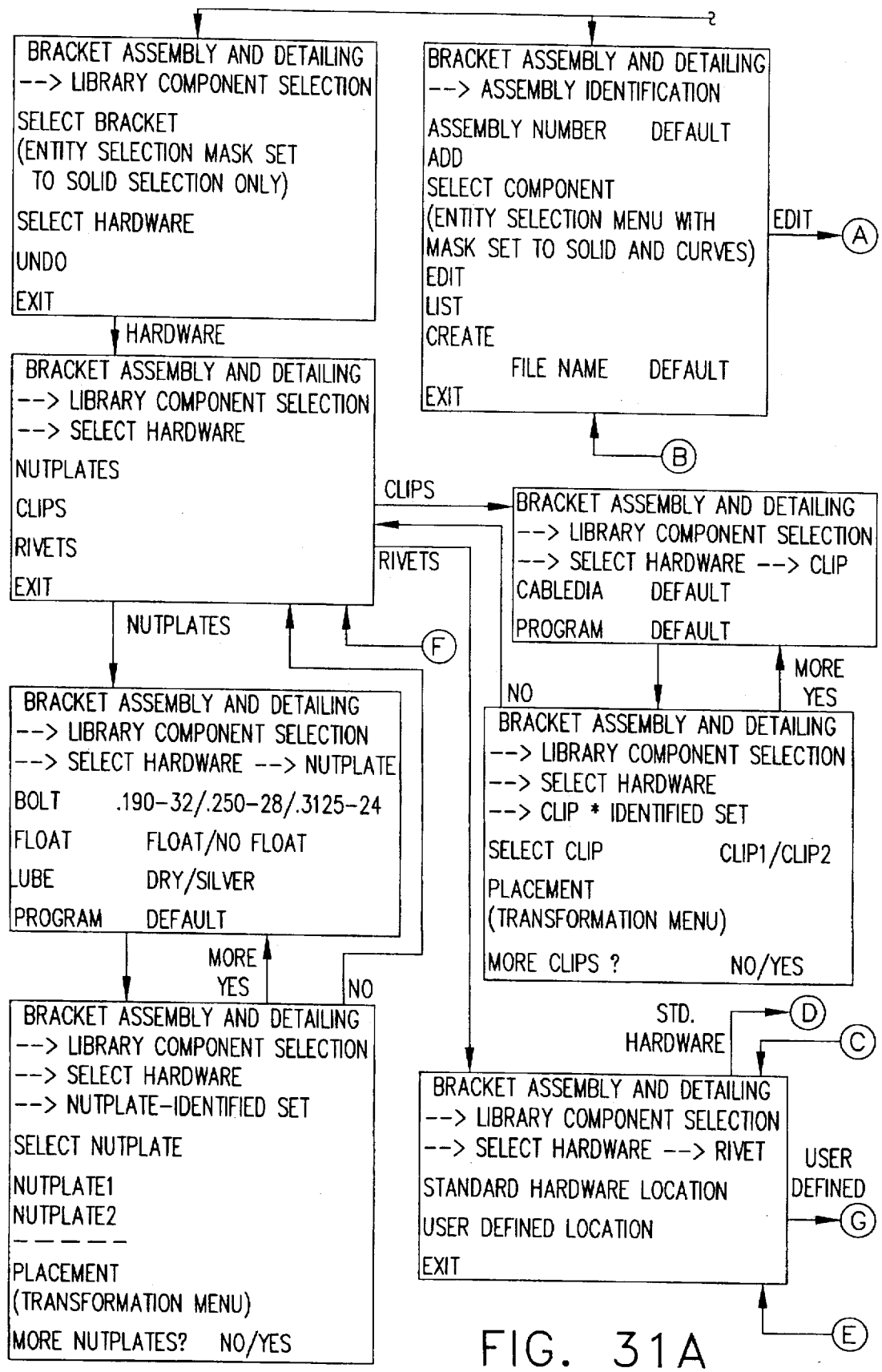
FIG. 31 illustrates the bracket assembly and detailing menu structure.
Figure 31B:
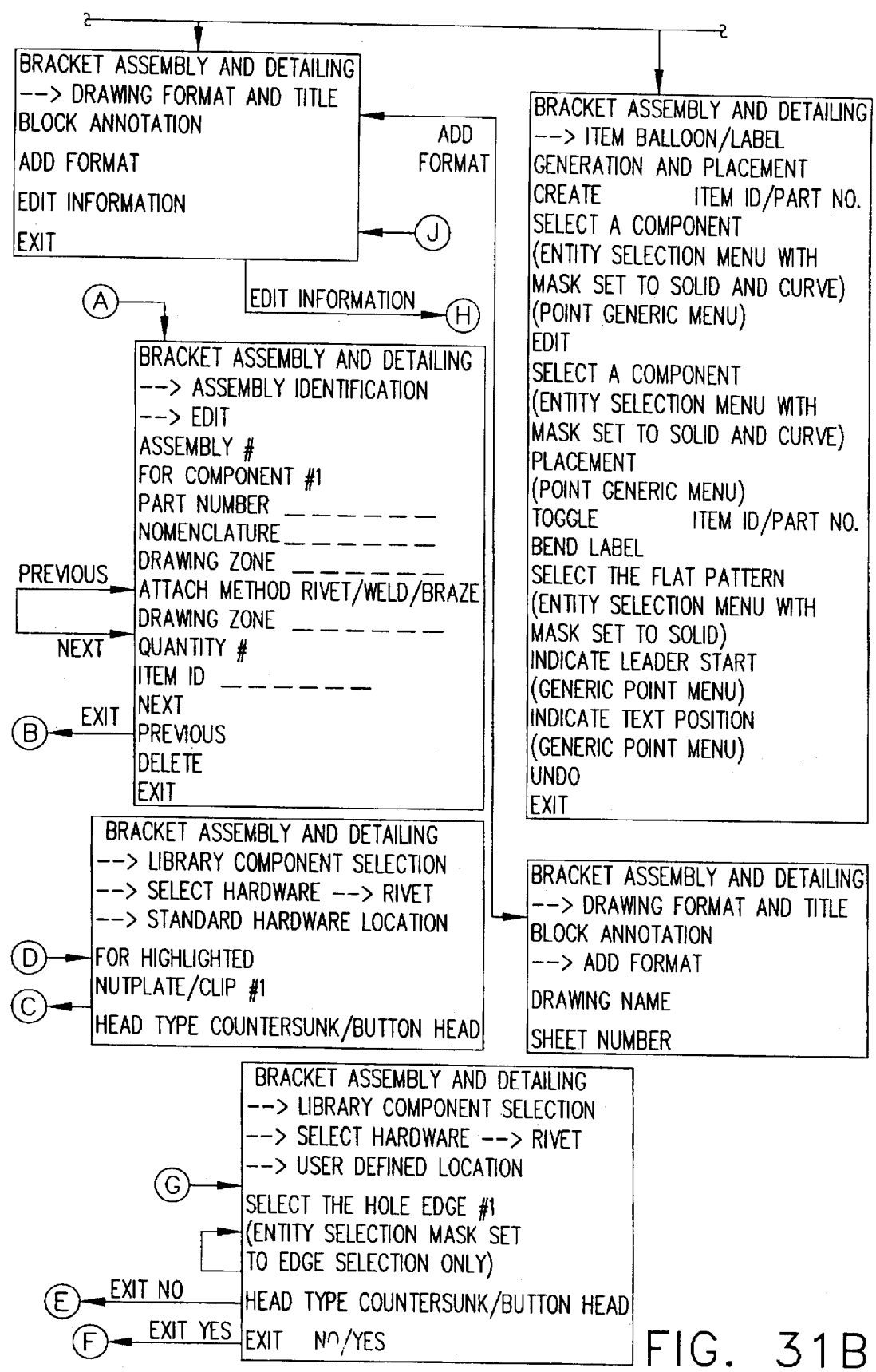
Figure 31C:
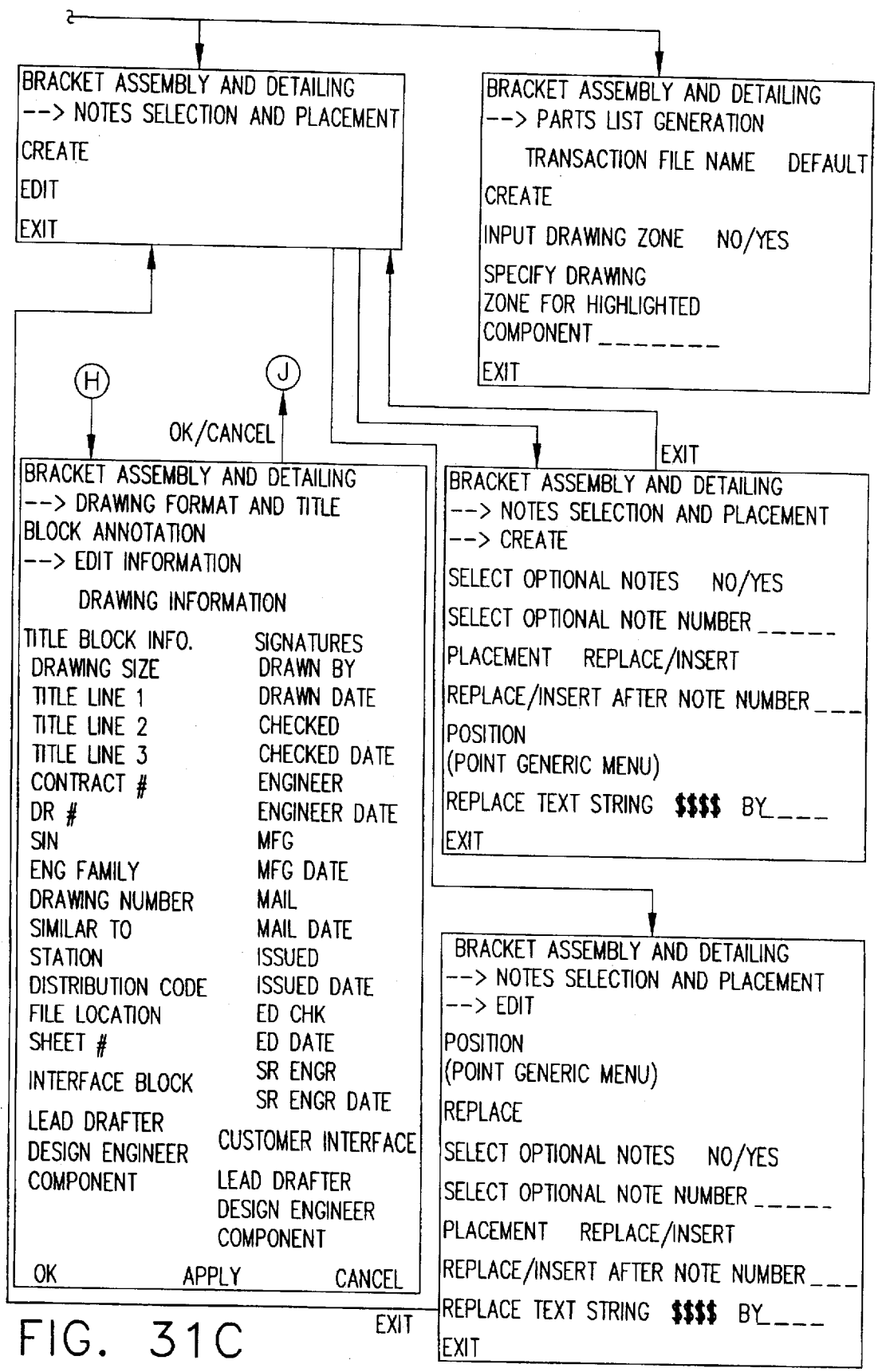

The menu structures for the bracket design system are illustrated in FIGS. 29, 30 and 31. Particularly, FIG. 29 illustrates the ICDS base menu structure from which the user selects a particular module for execution. FIG. 30 illustrates the bracket design menu structure. FIG. 31 illustrates the bracket assembly and detailing menu structure. The structures set forth in FIGS. 29, 30 and 31 are self explanatory and illustrate one embodiment for structuring menus for the bracket design system.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A design system for designing a bracket for a gas turbine engine, said design system comprising a computer including a part model library and a drawing note library, said computer receiving a bracket model in electronic form as input and having a plurality of executable modules stored therein, said modules comprising:

a bracket intelligence builder module for generating intelligence data for the bracket model, said module configured to prompt a user to select a feature if the model does not have intelligence data and to automatically attach intelligence data to the model based on the selected feature, said bracket intelligence builder module further configured to generate a consistency table usable for checking consistency of folded and unfolded models;

a bracket unfolding module for unfolding a bracket model to a flat pattern;

a bracket bend relief module for creating bend reliefs in the flat pattern;

a bracket folding module to fold a bracket flat pattern;

a bracket minimum material check module to check for minimum distances between bracket pattern features;

a bracket weld gap check module to identify weld gaps in the bracket model;

a flat pattern wireframe processor module to generate a bracket solid flat pattern;

a library component selection module to aid a user in selecting and orienting bracket components from said part model library;

a bracket assembly identification module for identifying relationships between bracket components to generate a parts list file;

a drawing format and title block annotation module for generating an annotated drawing format;

an item generation and placement module for placing item numbers on a drawing; and a bracket notes selection and placement module to determine a notes package for placement on a drawing.

2. A design system in accordance with claim 1 further comprising a notes package report writer module for generating notes packages in a report form.

3. A design system in accordance with claim 1 wherein said system is implemented as a user function sub-system to a computer aided design system.

4. A design system in accordance with claim 1 wherein said computer is implemented on a UNIX workstation.

5. A computer for designing brackets for a gas turbine engine, said computer programmed to:

prompt an operator for input regarding a bracket to be designed;

execute a bracket intelligence builder module for enabling the operator to associate characteristics with a bracket model, said bracket intelligence builder module configured to generate references for at least one of flanges, bends, bend angles and bend directions for the bracket, said bracket intelligence builder module further configured to generate a consistency table usable for checking consistency of folded and unfolded models; and generate an electronic file of the bracket model.

6. A computer in accordance with claim 5 further programmed to execute a bracket unfolding module for unfolding the bracket model to a flat pattern, the bracket unfolding module configured to receive a solid folded intelligent bracket model as input and to unfold the model to a flat pattern.

7. A computer in accordance with claim 5 further programmed to execute a bracket bend relief module for creating bend reliefs in a solid intelligent flat pattern of the bracket.

8. A computer in accordance with claim 5 further programmed to execute a bracket folding module for folding an intelligent flat pattern of the bracket.

9. A computer in accordance with claim 5 further programmed to execute a bracket minimum material check module for checking for minimum distances between feature in the bracket model.

10. A computer in accordance with claim 5 further programmed to execute a bracket weld gap check module for allowing the operator selecting weld gap characteristics on a folded bracket model.

11. A computer in accordance with claim 5 further programmed to execute a flat pattern wireframe processor module for converting line and arc entities representing a bracket flat pattern wireframe to a solid flat pattern.

12. A computer in accordance with claim 5 further programmed to execute a library component selection module to aid the operator in selecting and orienting bracket components.

13. A computer in accordance with claim 5 further programmed to execute a bracket assembly identification module for identifying relationships between bracket components to generate a parts list file.

14. A computer in accordance with claim 5 further programmed to execute a drawing format and title block annotation module for generating an annotated drawing format.

15. A computer in accordance with claim 5 further programmed to execute an item generation and placement module for placing item numbers on a drawing.

16. A computer in accordance with claim 5 further programmed to execute a bracket notes selection and placement module to determine a notes package for placement on a drawing.

17. A method for operating a computer to design a bracket for a gas turbine engine, the computer including a memory having a part model library and a drawing note library stored therein, the computer receiving a bracket model in electronic form as input and having a number of executable modules stored therein, said method comprising the steps of:

generating intelligence data for the bracket model using a bracket intelligence builder module, the module providing that at least some of the intelligence date is automatically generated;

generating a consistency table usable for checking consistency of folded and unfolded models:

creating bend reliefs in the bracket model;

checking the bracket model for minimum distances between bracket model features; and identifying weld gaps in the bracket model.

18. A method in accordance with claim 17 further comprising the steps of:

selecting and orienting bracket components in the bracket model from the part model library;

identifying relationships between bracket components to generate a parts list file;

generating an annotated drawing format;

placing item numbers on the drawing; and determining a notes package for placement on a drawing.

19. A method in accordance with claim 17 further comprising the steps of generating notes packages in a report form.

* * * * *